(12) United States Patent
Kawamoto et al.

(10) Patent No.: US 9,144,738 B2
(45) Date of Patent: Sep. 29, 2015

(54) INFORMATION PROCESSING SYSTEM, COMPUTER-READABLE STORAGE MEDIUM HAVING INFORMATION PROCESSING PROGRAM STORED THEREIN, AND INFORMATION PROCESSING METHOD

(75) Inventors: Kouichi Kawamoto, Kyoto (JP); Kiyofumi Funahashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 773 days.

(21) Appl. No.: 13/343,431

(22) Filed: Jan. 4, 2012

(65) Prior Publication Data
US 2013/0103789 A1   Apr. 25, 2013

(30) Foreign Application Priority Data
Oct. 20, 2011   (JP) .................................. 2011-230886

(51) Int. Cl.
G06F 15/16 (2006.01)
A63F 13/30 (2014.01)
H04L 29/06 (2006.01)
H04W 4/00 (2009.01)

(52) U.S. Cl.
CPC ................ *A63F 13/12* (2013.01); *H04L 67/38* (2013.01); *H04W 4/00* (2013.01); *A63F 2300/204* (2013.01); *A63F 2300/205* (2013.01); *A63F 2300/538* (2013.01)

(58) Field of Classification Search
USPC .......................... 709/217, 203, 202, 201, 238
See application file for complete search history.

(56) References Cited

U.S. PATENT DOCUMENTS

| 2003/0100326 A1* | 5/2003 | Grube et al. ................. 455/515 |
| 2004/0259642 A1 | 12/2004 | Tanaka et al. |
| 2005/0226166 A1* | 10/2005 | Agrawal et al. ............... 370/252 |
| 2007/0281623 A1* | 12/2007 | Liu ............................ 455/67.11 |
| 2011/0115634 A1* | 5/2011 | Monden ..................... 340/573.1 |

FOREIGN PATENT DOCUMENTS

| JP | 2005-28103 | 2/2005 |
| JP | 2006109915 A | 4/2006 |
| JP | 2007080033 A | 3/2007 |
| JP | 2011165219 A | 8/2011 |

\* cited by examiner

*Primary Examiner* — Lan-Dai T Truong
(74) *Attorney, Agent, or Firm* — Nixon & Vanderhye, P.C.

(57) ABSTRACT

Subject-data-to-be-collected representing an element to be collected is generated or selected, when a server and any one of a plurality of hand-held information terminals cooperate with each other to perform predetermined information processing by using data transmitted and received between the server and the one of the plurality of hand-held information terminals. Each of the plurality of hand-held information terminals transmits to and receives from another one of the plurality of hand-held information terminals, the subject-data-to-be-collected. Thus, pleasure of collecting the subject-data-to-be-collected by communication among the hand-held information terminals, is provided.

13 Claims, 14 Drawing Sheets

F I G. 1
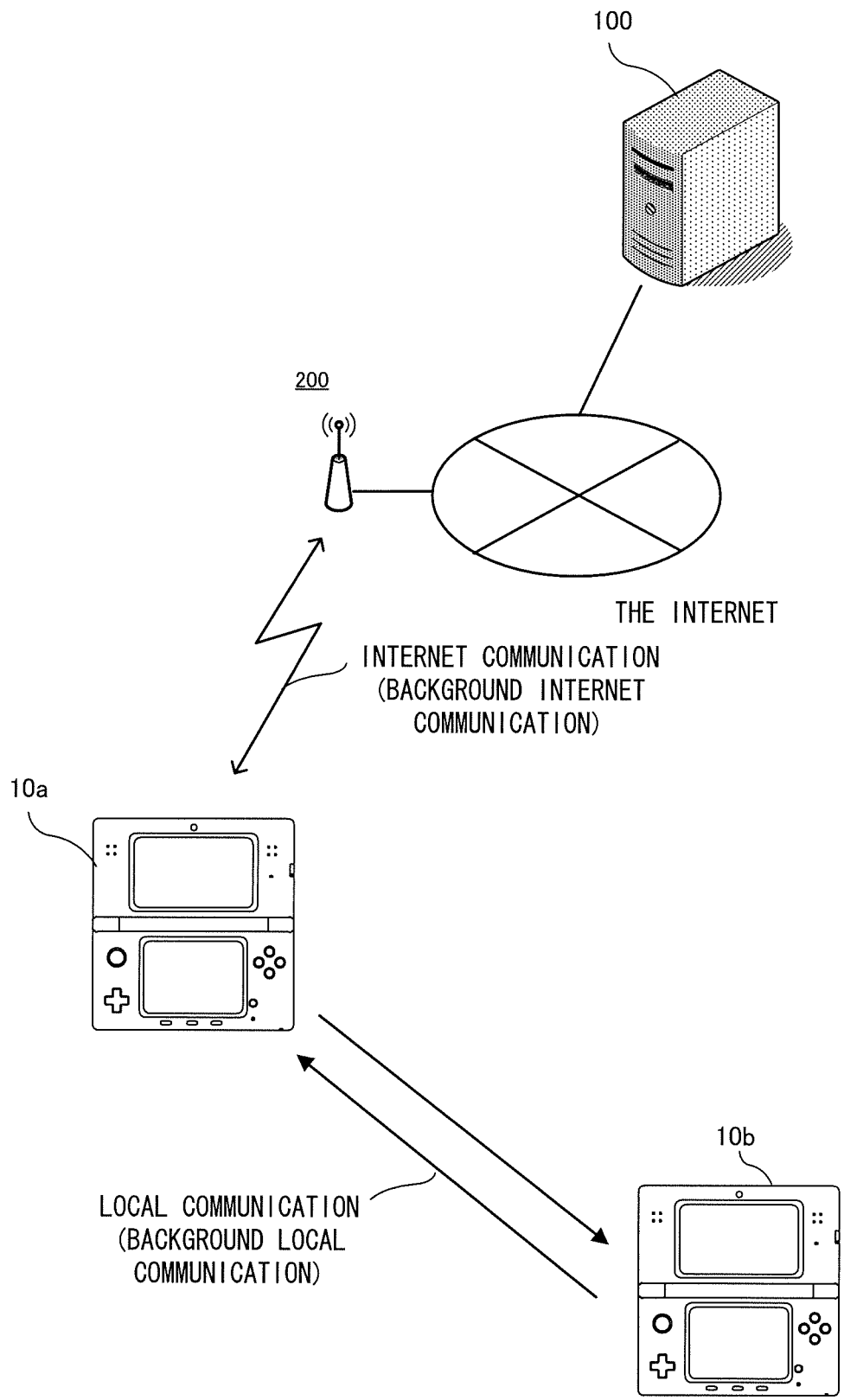

F I G. 4
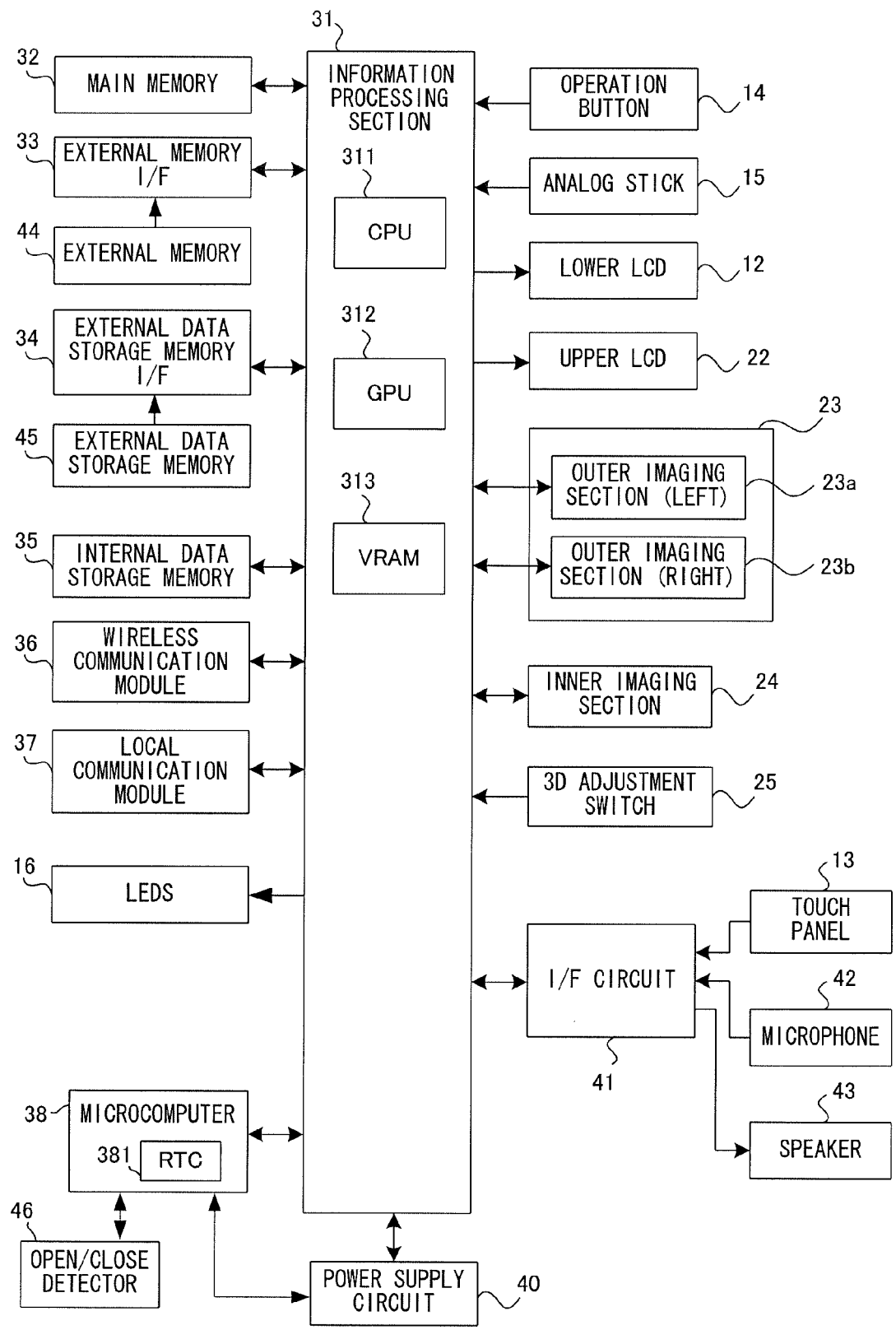

AREAS OF REGION A

205

| LOCATION OF REGION | GROUP NAME |
|---|---|
| (1,1)～(100,100) | GROUP A |
| (101,1)～(200,100) | GROUP B |
| ⋮ | ⋮ |

206

| AP IDENTIFIER | GROUP NAME |
|---|---|
| xxxxxA | GROUP A |
| xxxxxB | GROUP B |
| ⋮ | ⋮ |

F I G. 1 3
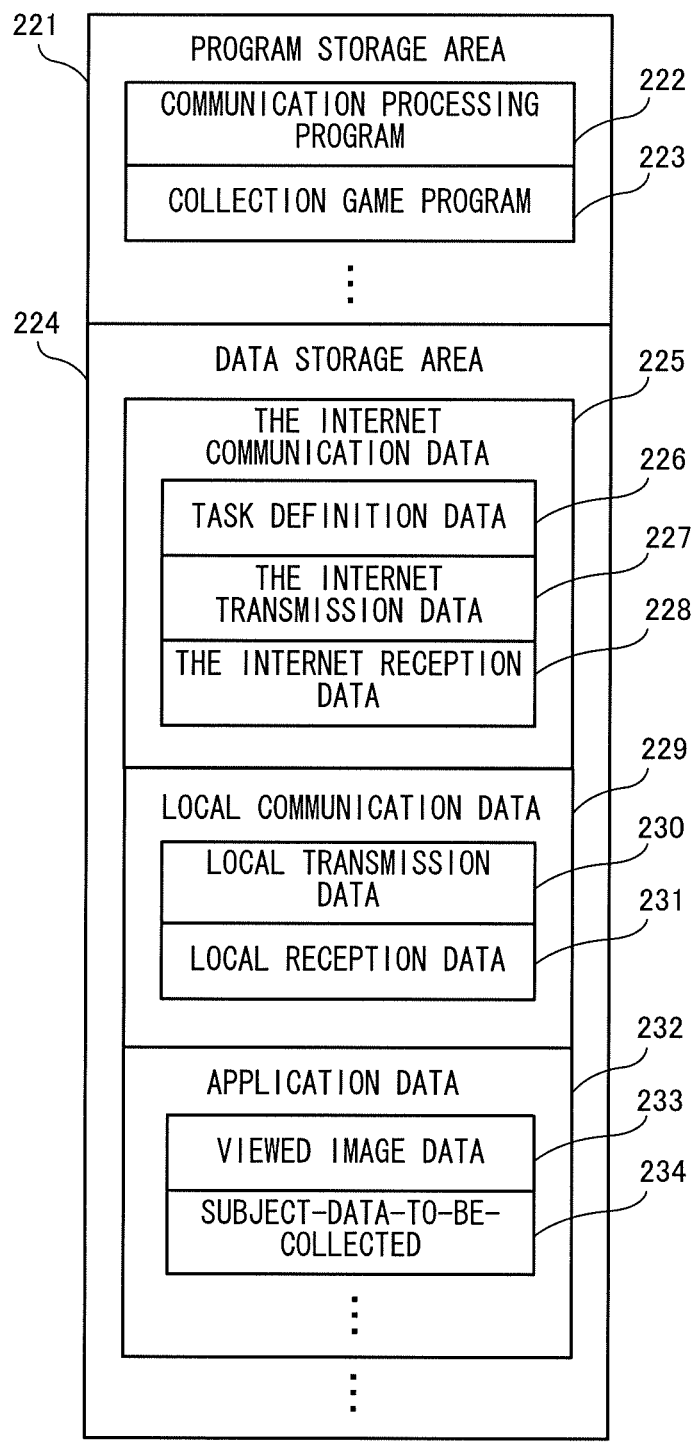

INFORMATION PROCESSING SYSTEM, COMPUTER-READABLE STORAGE MEDIUM HAVING INFORMATION PROCESSING PROGRAM STORED THEREIN, AND INFORMATION PROCESSING METHOD

CROSS REFERENCE TO RELATED APPLICATION

The disclosure of Japanese Patent Application No. 2011-230886, filed on Oct. 20, 2011, is incorporated herein by reference.

FIELD

The exemplary embodiments relate to information processing systems each including a server and a plurality of hand-held information terminals, and more particularly to data transmission and data reception between a server and a hand-held information terminal, and among a plurality of hand-held information terminals.

BACKGROUND AND SUMMARY

A technique that enables exchange of game data among hand-held game apparatuses capable of wirelessly communicating with each other has been known to date. In such a technique, when a condition for communication is satisfied among different game apparatuses which are within a communication-allowed range, the different game apparatuses perform transmission and reception of exchange conditions for exchanging game data among the game apparatuses. When the exchange conditions are satisfied, the game data is exchanged.

However, in the technique described above, since the game data which is previously stored in the game apparatuses (game cartridges) is exchanged, the game data which can be exchanged and collected is limited. Therefore, there is a room for improvement in maintaining of a user's motivation for collecting data from other game apparatuses.

Therefore, a feature of the exemplary embodiments is to make available an information processing system and the like capable of maintaining a user's motivation for collecting data that is a subject to be collected.

An information processing system according to the exemplary embodiment includes a server, and a plurality of hand-held information terminals connectable to the server via a network, and includes a first processor configured to generate or select subject-data-to-be-collected representing an element to be collected, when the server and any one of the plurality of hand-held information terminals cooperate with each other to perform predetermined information processing by using data transmitted and received between the server and the one of the plurality of hand-held information terminals. Further, the plurality of hand-held information terminals each include a first transmitter and receiver configured to transmit to and receive from another one of the plurality of hand-held information terminals, the subject-data-to-be-collected.

In the features described above, the server and one of the plurality of hand-held information terminals cooperate with each other to perform information processing by using data which is transmitted and received between the server and the one of the plurality of hand-held information terminals, thereby generating or selecting the subject-data-to-be-collected. The subject-data-to-be-collected which has been thus generated or selected is transmitted and received between the hand-held information terminals. Therefore, wide variations in the subject-data-to-be-collected can be obtained, so that a user's motivation for collecting the subject-data-to-be-collected can be maintained. For example, the subject-to-be-collected such as an image can be added on the server side, and distributed to the plurality of hand-held information terminals, thereby enabling the number and the kinds of subjects-to-be-collected to be increased.

According to another feature of the exemplary embodiment, the first processor may operate such that the server generates or selects the subject-data-to-be-collected by using data transmitted and received between the server and any one of the plurality of hand-held information terminals, and transmits, to the one of the plurality of hand-held information terminals, the subject-data-to-be-collected having been generated or selected. The first transmitter and receiver may transmit to and receive from the other one of the plurality of hand-held information terminals, the subject-data-to-be-collected transmitted from the server.

In the features described above, since the subject-data-to-be-collected is transmitted from the server to the plurality of hand-held information terminals, a plurality of pieces of subject-data-to-be-collected and/or data on which the subject-data-to-be-collected is based need not be previously stored in each of the hand-held information terminals, so that a memory capacity to be used or load of a memory can be reduced in each of the plurality of hand-held information terminals.

According to still another feature of the exemplary embodiment, the first processor may operate such that any one of the plurality of hand-held information terminals transmits, to the server, associated data which is associated with the one of the plurality of hand-held information terminals or a user of the one of the plurality of hand-held information terminals, and the server generates or selects the subject-data-to-be-collected using the associated data transmitted from the one of the plurality of hand-held information terminals.

In the features described above, the subject-data-to-be-collected to be distributed to each of the hand-held information terminals can be determined by using, for example, information unique to each of the hand-held information terminals or a user thereof.

According to still another feature of the exemplary embodiment, each of the plurality of hand-held information terminals may further include a positional information obtaining section configured to obtain positional information about a user or about a corresponding one of the plurality of hand-held information terminals, and the first processor may generate or select the subject-data-to-be-collected by using the positional information In the features described above, the subject-data-to-be-collected which is transmitted and received between one of the hand-held information terminals and another one of the hand-held information terminals can be associated with a position of each user or each hand-held information terminal.

According to still another feature of the exemplary embodiment, each of the plurality of hand-held information terminals may further include a region information obtaining section configured to obtain region information about a user or about a corresponding one of the plurality of hand-held information terminals, and the first processor may generate or select, by using the region information, the subject-data-to-be-collected having been subjected to sorting according to a region.

In the features described above, the subject-data-to-be-collected which is transmitted and received between one of the hand-held information terminals and another one of the hand-held information terminals can be associated with a region of each user or each hand-held information terminal.

According to still another feature of the exemplary embodiment, the server may further include an identification information obtaining section configured to obtain identification information for identifying a relay device which relays communication between each of the plurality of hand-held information terminals and the server, and the first processor may generate or select, by using the identification information, the subject-data-to-be-collected having been subjected to sorting according to the identification information.

In the features described above, the subject-data-to-be-collected which is transmitted and received between one of the hand-held information terminals and another one of the hand-held information terminals can be associated with the relay device. For example, each of the hand-held information terminals obtains the subject-data-to-be-collected which is different according to a location at which the access point is provided. In a case where an access point is provided for each chain store, each of the hand-held information terminals obtains the subject-data-to-be-collected which is different for each chain store.

According to still another feature of the exemplary embodiment, the subject-data-to-be-collected may be data representing a portion of one complete content.

In the features described above, for example, one complete content which is self-concluded as it is, such as an image, a music, a moving image, or binary data representing a game program, is divided into a predetermined number of pieces, and a user is allowed to enjoy collecting (fragmentary pieces of) such one complete content. Further, such a subject to be collected can be added anew, and distributed.

According to still another feature of the exemplary embodiment, the subject-data-to-be-collected may be data representing an individual element of a predetermined collection of elements.

In the features described above, for example, a user is allowed to also enjoy collecting data representing an element to be collected, such as a trading card. Further, such a subject to be collected can be added anew, and distributed.

According to still another feature of the exemplary embodiment, the subject-data-to-be-collected may be specifying data used for specifying a predetermined portion, a predetermined region, or a predetermined period of the entirety of the one complete content, and each of the plurality of hand-held information terminals may further include a storage section configured to store all data representing the one complete content, and the specifying data.

In the features described above, when data representing a completed state obtained by each subject-to-be-collected (a state in which all the subjects have been collected) is stored in each of the hand-held information terminals, data transmitted and received between the hand-held information terminals may indicate only a location of the data in the completed state, for example. Therefore, an amount of data to be transmitted and received can be reduced.

According to still another feature of the exemplary embodiment, each of the plurality of hand-held information terminals may further include an output processor configured to perform a predetermined output process by combining a plurality of pieces of the subject-data-to-be-collected.

In the features described above, a user is allowed to enjoy collecting fragmentary pieces (which make no sense if they are each handled as an individual piece) to complete some content.

According to still another feature of the exemplary embodiment, the first transmitter and receiver may connect to another one of the plurality of hand-held information terminals, which is a short distance away, and transmit to and receive from the one of the plurality of hand-held information terminals connected thereto, the subject-data-to-be-collected.

In the features described above, the subject-data-to-be-collected can be transmitted and received between the hand-held information terminals which are positioned physically at a short distance.

According to still another feature of the exemplary embodiment, the first transmitter and receiver may use a short distance wireless communication to wirelessly connect to another one of the plurality of hand-held information terminals, which is within a communication-allowed range, and transmit to and receive from the other one of the plurality of hand-held information terminals which is wirelessly connected thereto, the subject-data-to-be-collected.

In the features described above, for example, a user can collect the subject-data-to-be-collected by only going out with the hand-held information terminal, thereby reducing user's efforts for collecting the subject-data-to-be-collected.

According to the exemplary embodiment, a user's motivation for collecting data to be collected can be maintained.

These and other objects, features, aspects and advantages of exemplary embodiments will become more apparent from the following detailed description of the exemplary embodiments when taken in conjunction with the accompanying drawings.

BRIEF DESCRIPTION OF THE DRAWINGS

FIG. 1 shows a non-limiting exemplary configuration of the entirety of a system according to an exemplary embodiment;

FIG. 4 is a block diagram showing a non-limiting exemplary internal configuration of the game apparatus 10;

FIG. 13 shows a non-limiting exemplary memory map of the main memory 32 in the game apparatus 10;

DETAILED DESCRIPTION OF NON-LIMITING EXAMPLE EMBODIMENTS

Figure 2:
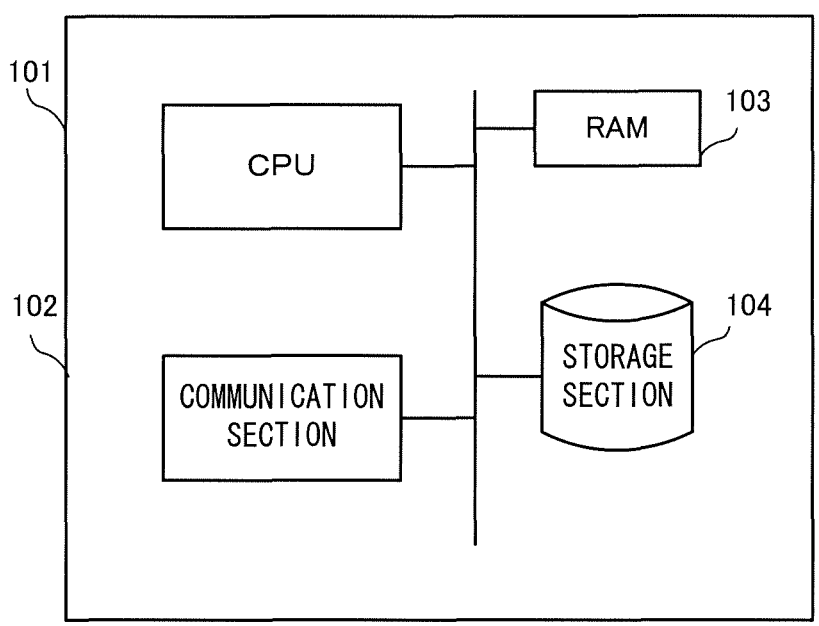
FIG. 2 shows a non-limiting exemplary configuration of a server 100.

Hereinafter, an exemplary embodiment will be described with reference to the drawings.

FIG. 1 shows a non-limiting exemplary configuration of the entirety of a system according to the exemplary embodiment. FIG. 1 shows a server 100, two hand-held game apparatuses 10a and 10b (hereinafter, each of which is simply referred to as a game apparatus. Alternatively, the game apparatuses 10a and 10b may be collectively referred to as a game apparatus 10), and an access point 200 connected to the Internet. The server 100 is configured to be connectable to the Internet. The game apparatus 10 is connectable to the Internet via the access point 200 by using wireless communication, and is capable of communicating with the server 100 via the Internet. Further, the game apparatus 10 can directly connect to and communicate with another game apparatus 10 by using short distance wireless communication. Hereinafter, communication via the access point 200 is referred to as "the Internet communication", and communication which is directly performed between the game apparatuses 10 is referred to as "local communication".

In the exemplary embodiment, in such a configuration, the server 100 and the game apparatus 10 cooperate (in conjunction) with each other by using the Internet communication ("the background Internet communication" described below), such that subject-data-to-be-collected (described below in detail) that is obtained by dividing complete data organized in whole, into a plurality of pieces of data, is generated or selected, to store the subject-data-to-be-collected in the game apparatus 10. By using the local communication ("background local communication" described below), for example, the subject-data-to-be-collected is exchanged among the game apparatuses 10 (by each of the game apparatuses 10 making a copy thereof). Namely, in a cooperative process performed between the game apparatus 10 and the server 100, the subject-data-to-be-collected is generated, and, for example, a process for allowing the game apparatuses 10 to collect the subject-data-to-be-collected from each other by using the local communication is performed (in order to eventually obtain the complete data organized in whole as described above). In a case where the subject-data-to-be-collected represents a part of one complete content, if a certain condition is satisfied as a result of the collection (for example, when a plurality of pieces of subject-data-to-be-collected are collected and combined with each other, a combination of the plurality of pieces of subject-data-to-be-collected represents a certain content), the game apparatus 10 outputs the content as, for example, an image and/or a sound.

(Configuration of Server 100)

Next, a configuration of each of the server 100 and the game apparatus 10 will be described. FIG. 2 is a functional block diagram schematically showing a non-limiting exemplary configuration of the server 100. In FIG. 2, the server 100 includes a CPU 101, a communication section 102, a RAM 103, a storage section 104, and the like. The communication section 102 has a function of communicating with the game apparatus 10 and the like via the Internet. In the storage section 104, data (described below in detail) used in a process according to the exemplary embodiment described herein is stored. Data used when the CPU 101 performs the process according to the exemplary embodiment described herein is read from the storage section 104 according to need, and temporarily stored in the RAM 103.

(Structure of Game Apparatus)

Figure 3:
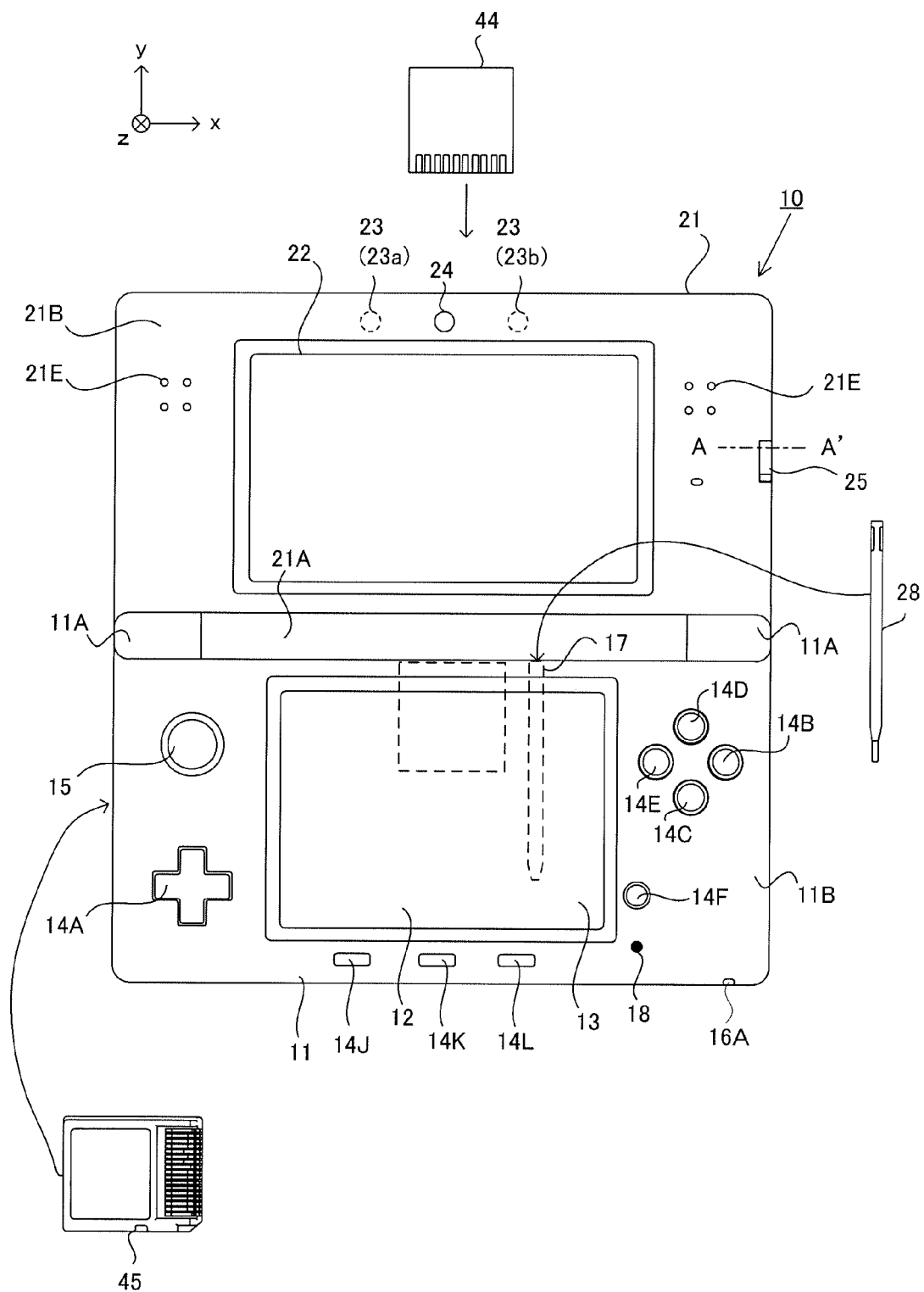
FIG. 3 is a front view showing a non-limiting example of a game apparatus 10 in an opened state.

Next, a structure of the game apparatus 10 will be described. In the exemplary embodiment, the game apparatus 10 is a foldable hand-held game apparatus. FIG. 3 shows the game apparatus 10 in an opened state. The game apparatus 10 in even the opened state has such a size as to enable a user to hold the game apparatus 10 with both hands or one hand.

The game apparatus 10 has a lower housing 11 and an upper housing 21. The lower housing 11 and the upper housing 21 are connected to each other so as to be openable and closable (foldable). In the example of FIG. 3, the lower housing 11 and the upper housing 21 are each formed in a horizontally long plate-like rectangular shape, and are connected to each other at long side portions thereof so as to be pivotable with respect to each other. In general, a user uses the game apparatus 10 in the opened state. When the game apparatus 10 is not used, a user keeps the game apparatus 10 in a closed state.

In the lower housing 11, a lower LCD (liquid crystal display) 12 is provided. The lower LCD 12 has a horizontally long shape, and is located such that a long side direction thereof corresponds to a long side direction of the lower housing 11. Although an LCD is used as a display device incorporated in the game apparatus 10 in the exemplary embodiment, any other display device such as a display device using EL (electro luminescence), or the like may be used. In addition, a display device having any resolution may be used for the game apparatus 10.

The lower housing 11 has operation buttons 14A to 14L and a touch panel 13 provided therewith as input devices. The operation buttons 14A to 14L are each an input device for making a predetermined input. As shown in FIG. 3, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, and a rightward direction. The button 14B, button 14C, button 14D, and button 14E are positioned so as to form a cross shape. The buttons 14A to 14E, the selection button 14J, the HOME button 14K, and the start button 14L are assigned functions, respectively, in accordance with a program executed by the game apparatus 10, according to need. For example, the cross button 14A is used for selection operation and the like, and the operation buttons 14B to 14E are used for, for example, determination operation and cancellation operation. Further, the power button 14F is used for powering the game apparatus 10 on/off.

The analog stick 15 is a device for indicating a direction, and is provided to the left of the lower LCD 12 in an upper portion of the inner side surface of the lower housing 11.

Four buttons, that is, the button 14B, the button 14C, the button 14D, and the button 14E are positioned so as to form a cross shape, and are each arranged in a position where a thumb of a right hand holding the lower housing 11 is naturally located. In addition, these four buttons and the analog stick 15 are positioned so as to be bilaterally symmetrical with respect to the lower LCD 12.

Further, a microphone hole 18 is provided in the inner side surface of the lower housing 11. Under the microphone hole 18, a microphone is provided as a sound input device described below, and the microphone detects for a sound from the outside of the game apparatus 10.

In FIG. 3, the operation buttons 14G to 14I are not shown. For example, the L button 14G is provided on the left end portion of the upper side surface of the lower housing 11, and the R button 14H is provided on the right end portion of the upper side surface of the lower housing 11. In addition, the volume button 14I is provided on the left side surface of the lower housing 11. The volume button 14I is used for adjusting a sound volume of a speaker of the game apparatus 10.

Further, the game apparatus 10 further includes the touch panel 13 as another input device in addition to the operation buttons 14A to 14L. The touch panel 13 is mounted on a screen of the lower LCD 12. Furthermore, an insertion opening 17 (indicated by dashed lines in FIG. 3) is provided in the upper side surface of the lower housing 11. A touch pen 28 used for performing an operation on the touch panel 13 can be accommodated in the insertion opening 17.

Further, a cover section 11C (not shown) is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably mounted to the connector. The external data storage memory 45 is used for, for example, storing (recording) data of an image taken by the game apparatus 10.

An insertion opening 11D (not shown) through which an external memory 44 having a game program stored therein is inserted is provided in the upper side surface of the lower housing 11. Inside the insertion opening 11D, a connector (not shown) is provided for electrically connecting to the external memory 44 in a detachable manner. When the external memory 44 is connected to the game apparatus 10, a predetermined game program is executed.

Further, a first LED 16A for notifying a user of an ON/OFF state of a power supply of the game apparatus 10 is provided on the lower side surface of the lower housing 11, and a second LED 16B (not shown) for notifying a user of an establishment state of a wireless communication of the game apparatus 10 is provided on the right side surface of the lower housing 11. The game apparatus 10 is capable of performing wireless communication with another apparatus, and the second LED 16B is lit up while the wireless communication is established. The game apparatus 10 has a function of connecting to a wireless LAN by using a method based on, for example, the standard of IEEE802.11b/g. A wireless switch 19 (not shown) for enabling/disabling the function of the wireless communication is provided on the right side surface of the lower housing 11.

On the other hand, in the upper housing 21, an upper LCD (liquid crystal display) 22, an outer imaging section 23 (an outer imaging section (left) 23a and an outer imaging section (right) 23b), an inner imaging section 24, a 3D adjustment switch 25, and a 3D indicator 26 are provided. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12. Further, the screen of the upper LCD 22 is set so as to be horizontally elongated as compared to the screen of the lower LCD 12.

The screen of the upper LCD 22 is provided on an inner side surface (main surface) 21B of the upper housing 21, and the screen of the upper LCD 22 is exposed at an opening of the upper housing 21.

The upper LCD 22 is a display device capable of displaying a stereoscopically viewable image. Further, the upper LCD 22 is a display device capable of switching between a stereoscopic display mode for displaying a stereoscopically viewable image and a planar display mode (for displaying a planar viewable image) for displaying an image in a planar manner. The switching of the display mode is performed, for example, by using the 3D adjustment switch 25 which is a slide switch.

Two imaging sections (23a and 23b) provided in an outer side surface 21D (the back surface opposite to the main surface on which the upper LCD 22 is provided) of the upper housing 21 are generically referred to as the outer imaging section 23. The outer imaging section (left) 23a and the outer imaging section (right) 23b are positioned so as to be bilaterally symmetrical with respect to the center of the upper LCD 22 (the upper housing 21).

The inner imaging section 24 is provided in the inner side surface (the main surface) 21B of the upper housing 21 and acts as an imaging section that has an imaging direction that is the same direction as the inward normal direction normal to the inner side surface. The inner imaging section 24 includes an imaging device (for example, a CCD image sensor and a CMOS image sensor) having a predetermined resolution, and a lens. The lens may have a zooming mechanism.

Further, a speaker hole 21E is provided in the inner side surface of the upper housing 21. A sound is outputted through the speaker hole 21E from the speaker 43 described below.

(Internal Configuration of Game Apparatus 10)

Next, an internal electrical configuration of the game apparatus 10 will be described with reference to FIG. 4. FIG. 4 is a block diagram showing a non-limiting exemplary internal configuration of the game apparatus 10. As shown in FIG. 4, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a microcomputer 38, a power supply circuit 40, an interface circuit (I/F circuit) 41, and the like. These electronic components are mounted on an electronic circuit substrate, and accommodated in the lower housing 11 (or the upper housing 21).

The information processing section 31 includes: a CPU (central processing unit) 311 for executing a predetermined program; a GPU (graphics processing unit) 312 for performing image processing; and the like. The CPU 311 of the information processing section 31 executes a program stored in a memory (for example, the external memory 44 connected to the external memory I/F 33 or the internal data storage memory 35) in the game apparatus 10 to perform a process corresponding to the program. The program executed by the CPU 311 of the information processing section 31 may be obtained from another apparatus by communication with the other apparatus. The information processing section 31 includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is a volatile memory used as a work area and a buffer area for (the CPU 311 of) the information processing section 31. Namely, the main memory 32 temporarily stores various data used in a process based on the program described above, and temporarily stores a program obtained from the outside (e.g., from the external memory 44 or another device). In the exemplary embodiment, for example, a PSRAM (Pseudo-SRAM) is used as the main memory 32.

The external memory 44 is a nonvolatile memory for storing a program executed by the information processing section 31. The external data storage memory 45 is implemented as a non-volatile readable and writable memory (for example, a NAND flash memory), and is used for storing predetermined data.

The internal data storage memory 35 is implemented as a non-volatile readable and writable memory (for example, a NAND flash memory), and is used for storing predetermined data.

The wireless communication module 36 has a function of connecting to a wireless LAN in a method based on, for example, the standard of IEEE 802.11b/g. In the exemplary embodiment, the wireless communication module 36 is mainly used for realizing the "Internet communication" described above. Further, the local communication module 37 has a function for realizing the "local communication" as described above. Specifically, the local communication module 37 has a function of performing wireless communication with the same type of game apparatus in a predetermined communication method (for example, a communication based on an independent protocol, or infrared communication). The wireless communication module 36 and the local communication module 37 are connected to the information processing section 31. The information processing section 31 can perform data transmission to and data reception from another device via the Internet by using the wireless communication module 36 (which is the Internet communication described above), and can perform data transmission to and data reception from the same type of another game apparatus by using the local communication module 37 (which is the local communication described above).

The microcomputer 38 performs processes such as a process concerning power management of the game apparatus 10, a process concerning time, and a process of detecting opening or closing of the housing. In addition, the microcomputer 38 receives a notification concerning these processes from the CPU 311, and also provides a notification concerning these processes to the CPU 311. The microcomputer 38 has a real time clock (RTC) 381. The RTC 381 counts a time and outputs the time to the CPU 311 via the microcomputer 38. For example, the CPU 311 is capable of calculating a current time (date) and the like based on the time counted by the RTC 381.

Further, the microcomputer 38 is connected to an open/close detector 46 and the power supply circuit 40. The open/close detector 46 detects opening or closing of the housing, and notifies the microcomputer 38 (further the CPU 311) of the detection result. The power supply circuit 40 controls power supplied from a power supply (typically, a battery accommodated in the lower housing 11) of the game apparatus 10 and supplies the power to each component of the game apparatus 10. In addition, the power supply circuit 40 receives a notification for shifting to a "sleep mode" (described below) or a notification for cancelling the "sleep mode", from the microcomputer 38 (from the CPU 311 via the microcomputer 38). Then, the power supply circuit 40 performs control for appropriately supplying power, based on the notification.

Now, a power control mode of the game apparatus 10 according to the exemplary embodiment will be described. In a state where the power supply such as a battery is mounted to the game apparatus of the exemplary embodiment described herein, and power can be supplied to each component, the game apparatus 10 basically operates in one of two power control modes that are a "normal power mode" and a "power saving mode". The "normal power mode" represents a state where power is supplied to all the components. For example, when the user actually operates the game apparatus 10 and plays a predetermined game, or when the user actually operates various applications, the power control mode is the "normal power mode". The "power saving mode" represents a state where power supply to only some of the components is continued and power supply to the other components is stopped. In the exemplary embodiment described herein, the "power saving mode" includes a "sleep mode". The "sleep mode" represents a state where power is supplied to only the microcomputer 38, the wireless communication module 36, and the local communication module 37, and power supply to the other components such as the CPU 311 and the LCDs is stopped (it is to be noted that the CPU 311 is allowed to receive an instruction for cancelling the "sleep mode").

To the information processing section 31, the I/F circuit 41 is connected. The microphone 42 and the speaker 43 are connected to the I/F circuit 41. The microphone 42 detects a voice from a user, and outputs a sound signal to the I/F circuit 41. The touch panel 13 is connected to the I/F circuit 41. The I/F circuit 41 includes a sound control circuit for controlling the microphone 42 and the speaker 43, and a touch panel control circuit for controlling the touch panel.

The operation button 14 includes the operation buttons 14A to 14L described above, and is connected to the information processing section 31. Operation data indicating an input state of each of the operation buttons 14A to 14L (whether or not each button has been pressed) is outputted from the operation button 14 to the information processing section 31. The information processing section 31 obtains the operation data from the operation button 14, to perform a process according to the input on the operation button 14.

The lower LCD 12 and the upper LCD 22 are connected to the information processing section 31. The lower LCD 12 and the upper LCD 22 each displays an image according to an instruction from (the GPU 312 of) the information processing section 31. In the exemplary embodiment described herein, the information processing section 31 displays a stereoscopic image (stereoscopically viewable image) by using the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits an electrical signal corresponding to a position of a slider 25a, to the information processing section 31.

(Outline of Process Performed by Server 100 and Game Apparatus 10)

Next, an outline of a process according to the exemplary embodiment will be described. Firstly, an operation for a communication process which is performed by the game apparatus 10 in order to perform the process according to the exemplary embodiment, will be briefly described. As described above, in the exemplary embodiment described herein, the game apparatus 10 implements two operation modes, that is, the "normal power mode" and the "sleep mode". In the "sleep mode", a process according to the "Internet communication" and a process according to "the local communication" automatically alternate with each other. For example, when the "sleep mode" is executed, the process according to the "local communication" is firstly performed for 30 seconds, and thereafter the process according to the "Internet communication" is performed for a predetermined time period (for example, in the case of some data transmission or data reception occurring, the process according to the "Internet communication" is performed until the data transmission or the data reception is completed). Thereafter, the process according to the "local communication" is performed again for 30 seconds, and the process according to the "Internet communication" is then performed. In the following description, the process according to the "Internet communication" is referred to as "the background Internet communication", and the process according to the "local communication" is referred to as "background local communication".

Supplementary description about the operations according to the "background Internet communication" and the "background local communication" will be given. When the "background Internet communication" is performed, whether or not a predetermined access point 200 is located near the game apparatus 10 is firstly determined (for example, a beacon from the access point 200 is detected for). When the presence of the access point 200 near the game apparatus 10 is detected, the game apparatus 10 automatically connects to the access point 200, and performs communication with a predetermined server 100 via the Internet. On the other hand, when the "background local communication" is performed, the game apparatuses 10 themselves transmit beacons for the "background local communication", and the game apparatuses 10 detect for the beacons, so that whether or not another game apparatus 10 is near an own game apparatus 10 is determined. When another game apparatus 10 is detected, connection to the other game apparatus 10 according to the "local communication" is established, to perform predetermined data transmission and reception.

When the game apparatus 10 operates in the "normal power mode", the game apparatus 10 is allowed to perform the "background Internet communication" or the "background local communication", according to need, based on to a state of a game, an application, or the like which is executed at that time. Further, a user is allowed to manually operate to execute the "background Internet communication" or the "background local communication".

In the exemplary embodiment, the following process is performed in a state where the operation for the communication process as described above is performed. Firstly, the game apparatus 10 and the server 100 cooperate with each other to perform a cooperative process by using data to be transmitted and received between the game apparatus 10 and the server 100, thereby generating or selecting "subject-data-to-be-collected". The subject-data-to-be-collected is stored in the game apparatus 10. By performing the "background local communication", the game apparatuses 10 exchange the subject-data-to-be-collected with each other (to be precise, the game apparatuses 10 each make a copy of the subject-data-to-be-collected and transmit the copy, and therefore it can be said that the subject-data-to-be-collected is spread).

The "subject-data-to-be-collected" will be described. In the exemplary embodiment described herein, the "subject-data-to-be-collected" is data corresponding to one piece, such as a piece of a jigsaw puzzle (in other words, a fragmentary data as an element to be collected), obtained by one complete content being divided into a plurality of pieces. Further, the "subject-data-to-be-collected" also corresponds to data representing an element that is to be collected for a collection, such as an individual card used in a trading card game, an individual monster used in a game in which monsters are collected and are caused to fight against each other, and an item used in a game. Moreover, for example, in a game in which robots are caused to fight against each other, when each robot is formed by combination of four parts that are a head, a body, arms, and legs, and plural kinds of patterns are further prepared for each part (for example, four kinds of heads, and eight kinds of bodies are prepared), data corresponding to each pattern of the part may also correspond to the "subject-data-to-be-collected". Namely, the "subject-data-to-be-collected" is handled as: "fragmentary" data (which may be referred to as "missing" data) that does not make sense by itself, and can represent, if a plurality of pieces of the "fragmentary" data are collected, one complete content (for example, an image, a music, a moving image, a map, a game stage, a document, a password, a program, and the like), as in a jigsaw puzzle; and data which not only can represent, if handled as a whole, one organized concept as a collection of a plurality of cards like cards used in a trading card game, but also is handled as a "subject to be collected" which is fundamentally intended to be collected and exchanged while being useful alone as it is. Further, the "subject-data-to-be-collected" may double as "fragmentary" data like the part of the robot, and a "subject to be collected". In other words, data corresponding to "a component", a "fragmentary piece", or a "missing piece" of a "completed product", or data corresponding to an "individual element" in a "collection of elements", is referred to as the "subject-data-to-be-collected" in the exemplary embodiment described herein.

As specific contents of the "subject-data-to-be-collected", data representing a real object of the "fragmental piece" or the "individual element" as described above may be used, or data representing, for example, an index that indicates a location of the "fragmental piece" in the "completed product", or that indicates a position of the "individual element" relative to the whole "collection", may be used instead of representing a real object. For example, in the case of a jigsaw puzzle and the like, the "subject-data-to-be-collected" may be data that represents an image of a real piece, or data that represents a location of the piece in a completed picture. Further, in the case of a trading card game, the "subject-data-to-be-collected" may be data that represents a real card itself, or data that represents, for example, a card number only. In a case where data representing an index is used as the "subject-data-to-be-collected", data amount of the "subject-data-to-be-collected" is reduced as compared to in a case where data representing a real fragmental piece is used, so that a time period for completing a process of transmitting or receiving the "subject-data-to-be-collected" in the "background local communication" or the like can be reduced. On the other hand, in a case where data representing an index is used as the "subject-data-to-be-collected", since the "subject-data-to-be-collected" is data representing, for example, a location in the "completed product" (for example, data representing a location at which the piece is to be put in the completed picture of a jigsaw puzzle), data representing the real completed product is preferably stored in the game apparatus 10 when the "subject-data-to-be-collected" is exchanged. For example, when it is desired that images representing pieces having been collected for a jigsaw puzzle up to that time be displayed, the images of the pieces cannot be displayed by using only data representing indexes (it is to be noted that a program is configured so as to enable a completed picture to be viewed only when all the pieces have been collected). When the "subject-data-to-be-collected" is data representing the real "fragmentary piece" or the real "individual element", data representing the real "completed product" or the real "whole collection" may not always be stored in the game apparatus 10 in advance. In an exemplary case of jigsaw puzzle, an image of the piece can be displayed by using only data representing an image of the real piece.

In the following description, for convenience' sake, an image is divided into a plurality of pieces as in, for example, the jigsaw puzzle as described above, and one piece among the plurality of pieces that form the image is used as an example of the "subject-data-to-be-collected" described above. Namely, in the following description, a game system will be described in which the server 100 distributes one piece for a jigsaw puzzle to the game apparatus 10, and the "background local communication" is repeatedly performed among the game apparatuses 10, to collect the pieces, so that the jigsaw puzzle is eventually completed.

Figure 5:
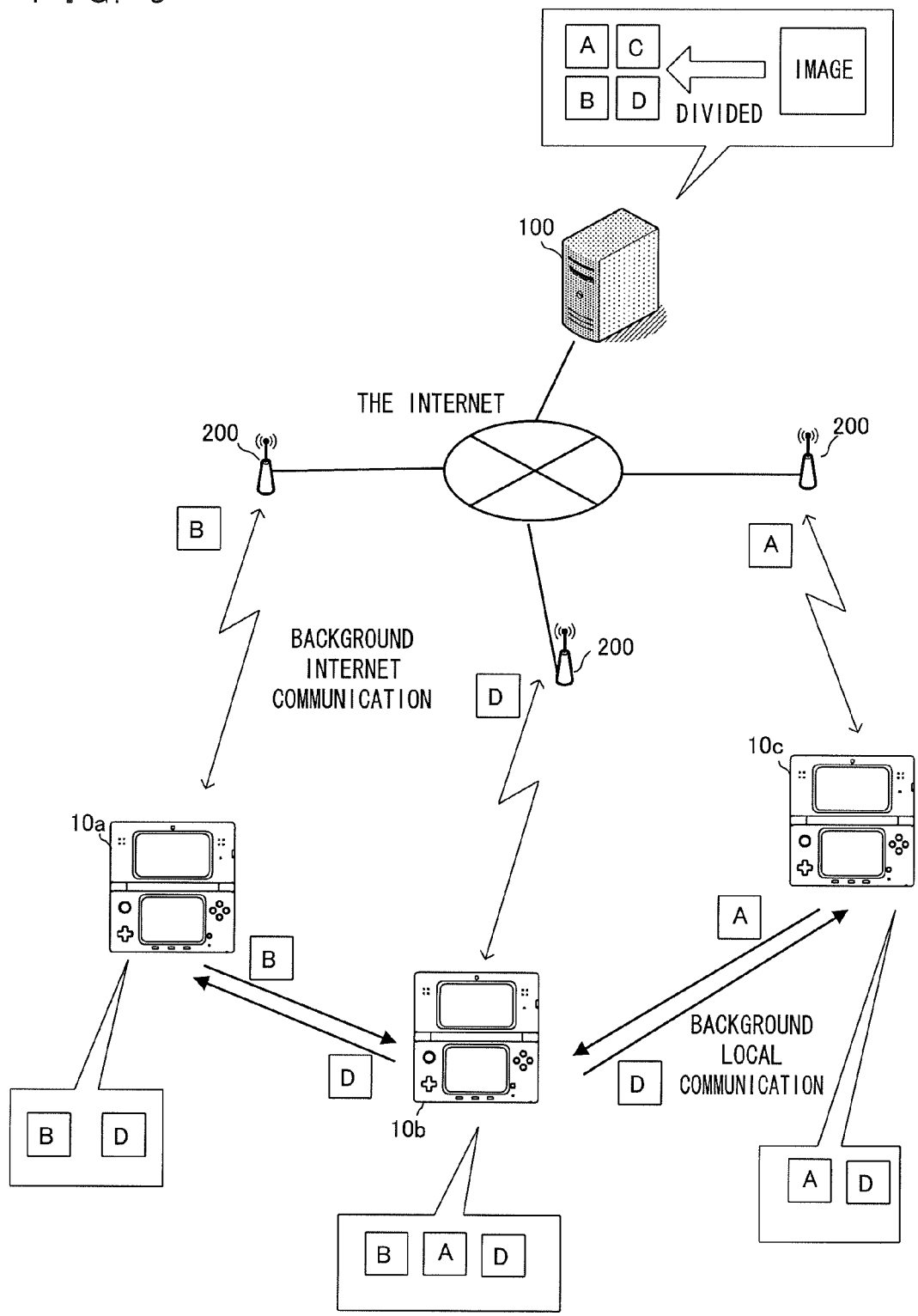
FIG. 5 schematically shows a non-limiting exemplary outline of a process according to the exemplary embodiment.

FIG. 5 schematically shows a non-limiting exemplary outline of a process according to the exemplary embodiment as described above. In FIG. 5, an image is divided into four pieces, that is, a piece A, a piece B, a piece C, and a piece D. Any one of the pieces is transmitted to each of three game apparatuses, that is, the game apparatuses 10a, 10b, and 10c, by using the "background Internet communication". In the description herein, the server 100 uses the "background Internet communication" to distribute the piece B to the game apparatus 10a, distribute the piece D to the game apparatus 10b, and distribute the piece A to the game apparatus 10c. In the exemplary embodiment described herein, the description is given on the assumption that the distribution of the piece from the server 100 to each of the game apparatuses 10 is performed once. However, the number of times the distribution is performed may be plural. The piece B of the game apparatus 10a and the piece D of the game apparatus 10b are exchanged for each other by using the "background local communication". Specifically, the game apparatus 10a makes a copy of the piece B, and transmits the copied piece B to the game apparatus 10b while the game apparatus 10b makes a copy of the piece D, and transmits the copied piece D to the game apparatus 10a. Further, the piece B of the game apparatus 10b and the piece A of the game apparatus 10c are exchanged for each other by using the "background local communication". Namely, the game apparatuses 10 exchange the pieces thereamong by using the "background local communication", thereby collecting the pieces in each of the game apparatuses 10.

Figure 6:
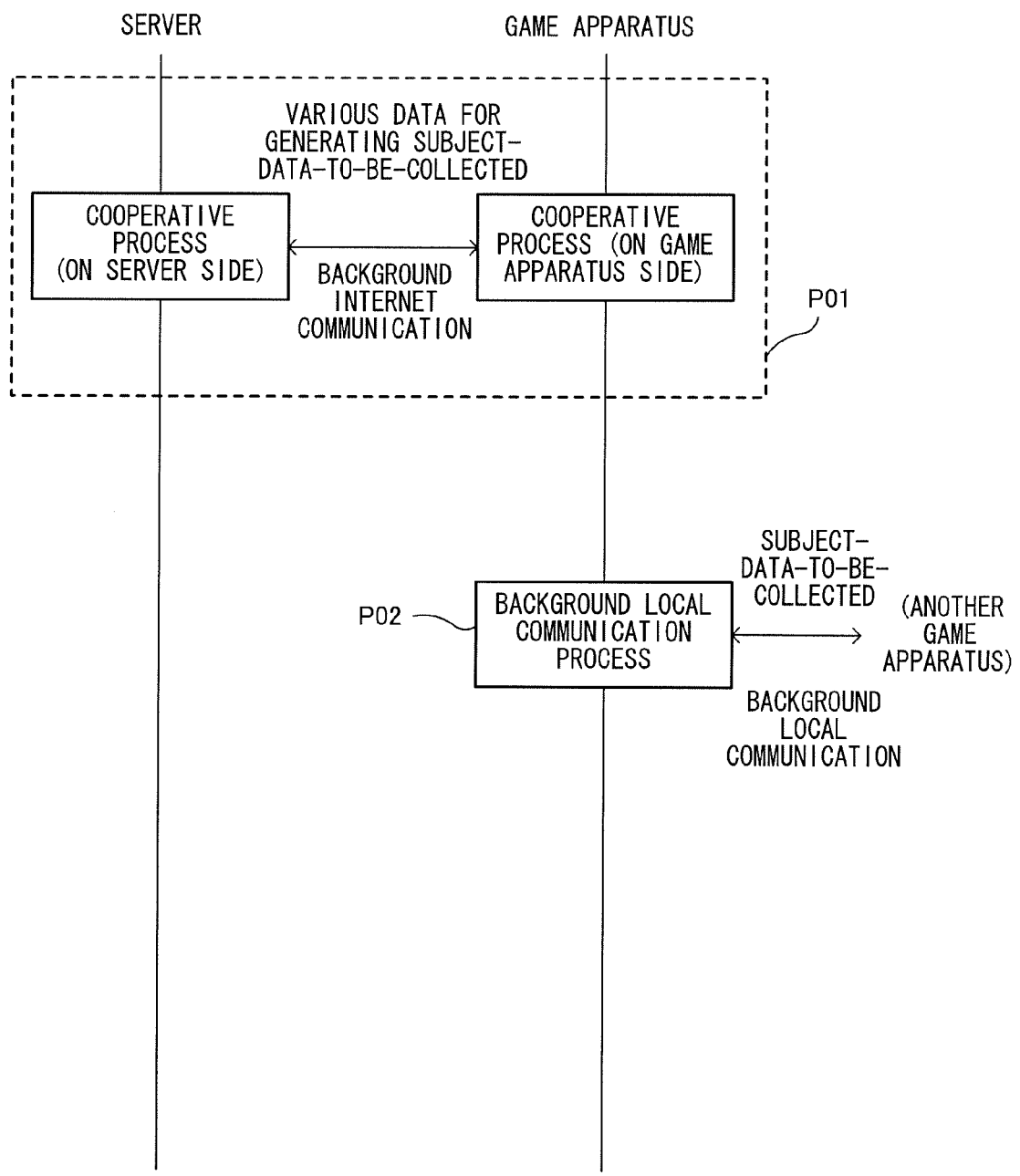
FIG. 6 shows a non-limiting exemplary outline of a flow of the process according to the exemplary embodiment.

FIG. 6 shows a non-limiting exemplary main flow of the process as described above. As shown in FIG. 6, a "cooperative process" (P01) is firstly performed between the server 100 and the game apparatus 10 by using the "background Internet communication", to generate or select the "subject-data-to-be-collected". Thereafter, the "background local communication process" (P02) is performed between the game apparatus 10 and another game apparatus 10, to exchange (collect) the subject-data-to-be-collected.

Figure 7:
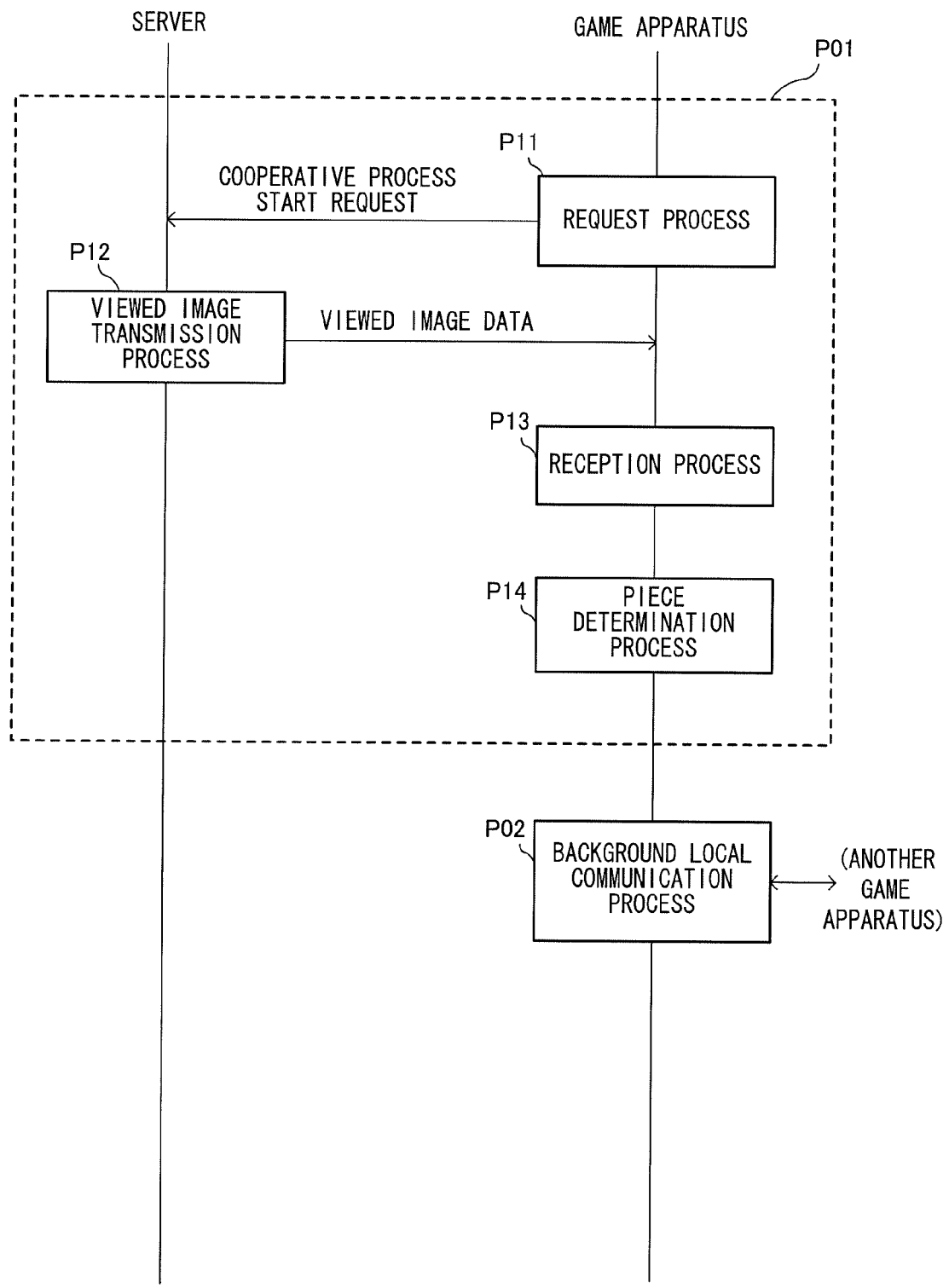
FIG. 7 shows a non-limiting exemplary outline of a cooperative process.

Next, specific exemplary contents of the cooperative process will be described. FIG. 7 shows a non-limiting exemplary outline of the cooperative process. As shown in FIG. 7, the server 100 and the game apparatus 10 cooperate with each other to perform the cooperative process P01. The cooperative process P01 includes a series of process steps P11 to P14. In the cooperative process P01, a request process (P11) is firstly performed by the game apparatus 10. This process is a process which is predefined as a background process of the game apparatus 10, and is preset so as to be performed at predetermined time intervals (in both the "sleep mode" and the "normal power mode"). In this process, the game apparatus 10 connects to the server 100 via a predetermined access point 200 by using the "background Internet communication", and transmits a request for executing the "cooperative process". In response thereto, the server 100 performs a viewed image transmission process (P12) for transmitting a predetermined viewed image to the game apparatus 10. The viewed image is an image which has yet to be divided, and which is represented by data of an image corresponding to, for example, a completed picture of a jigsaw puzzle.

Figure 8:
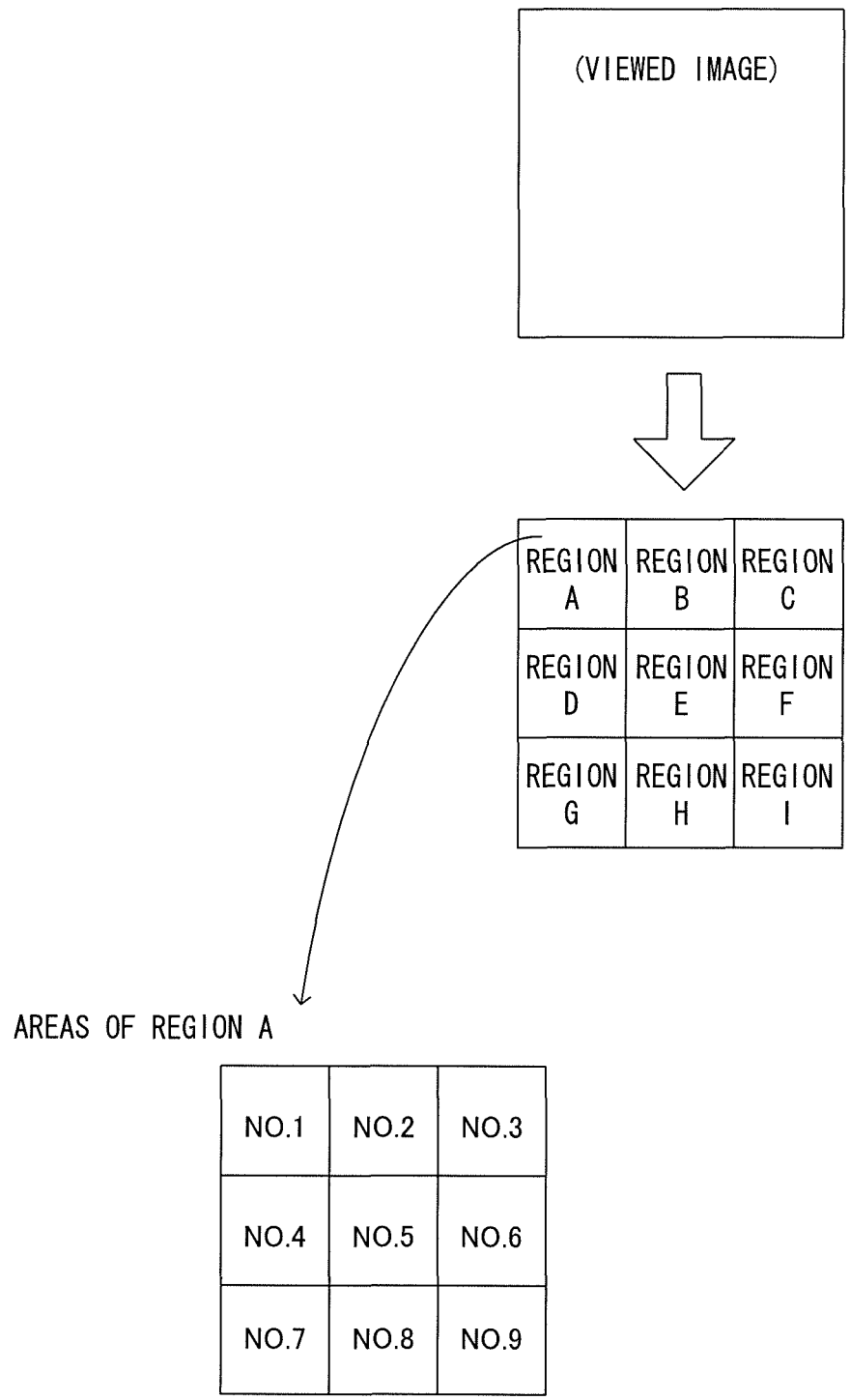
FIG. 8 shows a non-limiting exemplary division of a viewed image.

Next, the game apparatus 10 performs a reception process (P13) for receiving data of the viewed image to receive the data of the viewed image transmitted from the server 100, and stores the data in the game apparatus 10. Next, the game apparatus 10 performs a process (P14) for determining a piece to be obtained therein, based on the data of the viewed image having been received, and storing the piece as the subject-data-to-be-collected. A method for dividing the image according to the exemplary embodiment will be briefly described prior to this process being described. FIG. 8 shows a non-limiting exemplary concept of the method for dividing the viewed image according to the exemplary embodiment. In the exemplary embodiment described herein, firstly, the viewed image is equally divided into nine pieces. The nine pieces are associated with predetermined regions (in the case of Japan, for example, the Kanto Region, the Kansai Region, the Shikoku Region, and the Kyushu Region. In the case of the United States, for example, the East Coast Region, the West Coast Region, and the Western Region), respectively. FIG. 8 shows a non-limiting exemplary case in which the regions obtained by the division are associated with a region A to a region I, respectively. Namely, one image is divided and sorted on a region basis (it is to be understood that the number of pieces into which the image is divided is not limited to nine.)

Further, in the exemplary embodiment described herein, each region is equally divided into nine pieces. FIG. 8 shows a non-limiting exemplary case in which the region of an image of the region A is divided into areas NO. 1 to NO. 9.

In the exemplary embodiment described herein, a method for determining a piece to be initially allocated to each game apparatus 10 is as follows. Firstly, one of the nine regions of the viewed image having been received is specified by using "region information" stored in the game apparatus 10 as "apparatus body setting data". One of the pieces NO. 1 to NO. 9 in the specified region is determined by using a random number. The piece having been thus determined is stored as the "subject-data-to-be-collected". The "subject-data-to-be-collected" is stored so as to be associated with a piece ID for identifying a region to which the piece belongs in the viewed image.

An exemplary case in which geographical regions are used is described above. It is to be understood that an image may be sorted based on sections other than the geographical regions. Further, in the following description, the specification using a predetermined section such as a "geographical region" as described above may be referred to as a "first specification", and the specification using the random number as described above may be referred to as a "second specification".

Thus, a process in which the viewed image is received from the server 100, and a portion of the image is extracted as a piece on the game apparatus side, is performed as an exemplary cooperative process.

In the game apparatus 10, a content of an image to be displayed is determined based on the "subject-data-to-be-collected" stored therein. Namely, although all the data for the viewed image has been obtained, only a portion represented by the pieces corresponding to the "subject-data-to-be-collected" stored therein can be viewed (displayed).

Figure 9:
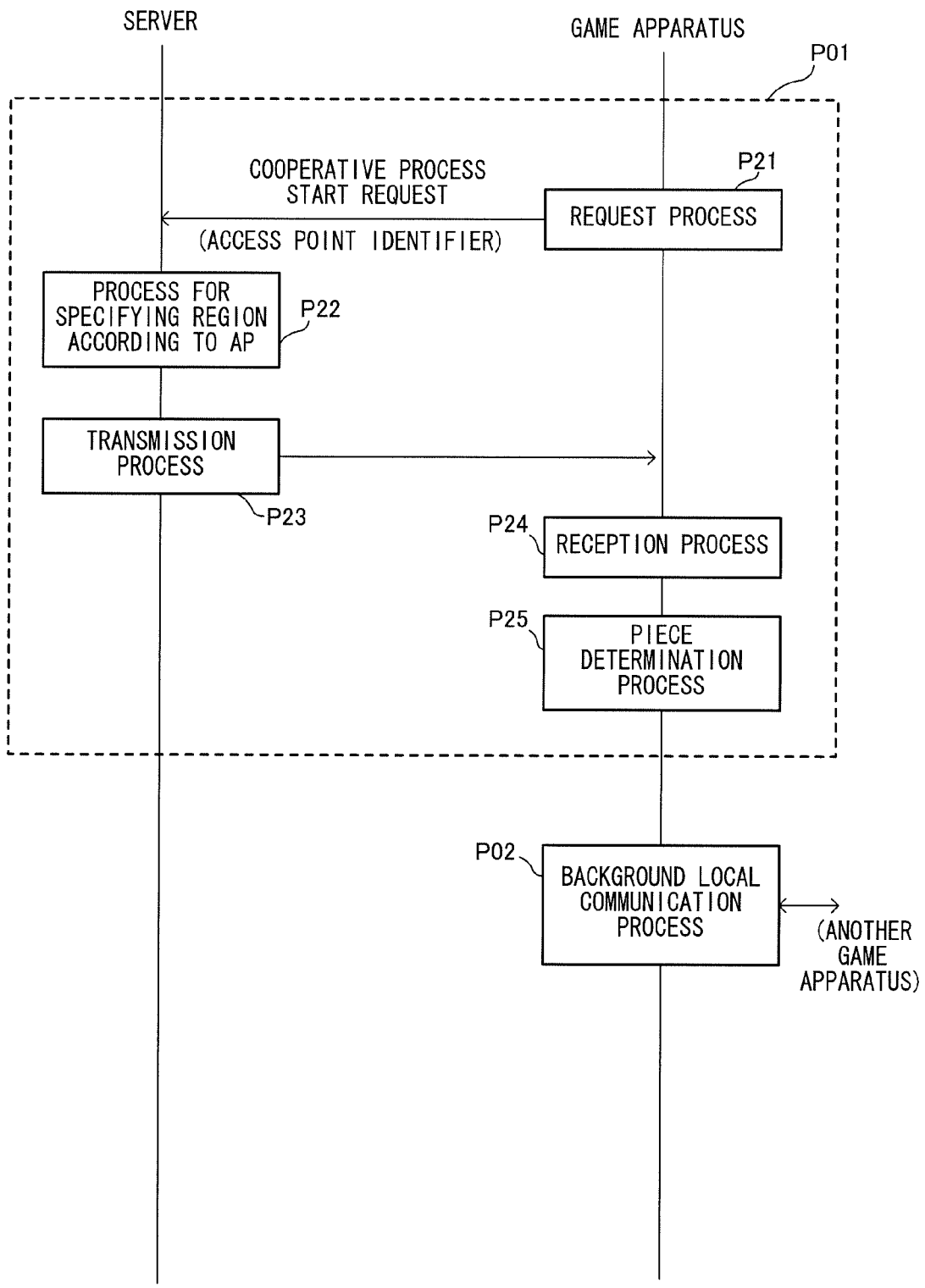
FIG. 9 shows another non-limiting exemplary outline of the cooperative process.

Next, FIG. 9 shows another non-limiting exemplary outline of the cooperative process. In the example shown in FIG.

9, a portion of the process for determining a piece is performed on the server 100 side. As shown in FIG. 9, firstly, the game apparatus 10 performs a request process (P21). At this time, the game apparatus 10 communicates with the server 100 via the predetermined access point 200. In the exemplary embodiment described herein, an access point identifier for identifying the access point 200 connected to the game apparatus 10 is also transmitted to the server 100. For example, when the game apparatus 10 establishes connection to the predetermined access point 200, the game apparatus 10 obtains the access point identifier from the access point 200. In the request process, data containing the access point identifier is transmitted to the server 100. Thus, on the server 100 side, the access point 200 through which the game apparatus 10 transmitting the request has accessed the server 100 can be identified.

Next, the server 100 performs a "first specification", as described above, on the viewed image based on the access point identifier (P22). This is performed in the following manner, for example. Firstly, the access points 200 are previously grouped. For example, the access points 200 are grouped by region according to a location at which the access point 200 is provided, or the access points 200 are grouped by shop in which the access point 200 is provided. For the convenience' sake in description, the access points 200 are previously sorted into nine groups. Further, the viewed image is equally divided into nine regions, and each region is associated with one of the groups into which the access points 200 are sorted. Data representing a correspondence table in which the association is defined is generated, and previously stored in the server 100. One of the regions, on the viewed image, associated with a corresponding one of the groups of the access points is specified with reference to the access point identifier and the correspondence table.

When the region is specified, region specifying data representing (a location of) the specified region, and the viewed image data are then transmitted from the server 100 to the game apparatus 10 (P23).

The game apparatus 10 receives the region specifying data and the viewed image data (P24). Next, the game apparatus 10 generates the "subject-data-to-be-collected" based on the region specifying data and the viewed image data (P25). Specifically, a predetermined region (corresponding to one of region A to region I indicated at the middle portion in FIG. 8) is specified in the viewed image having been received, by using the region specifying data having been received (the first specification). For example, the specified region is further divided into nine areas (corresponding to areas NO. 1 to NO. 9 indicated at the lower portion in FIG. 8), and one of the nine areas is selected by using a random number (the second specification), and the selected area is stored as the "subject-data-to-be-collected".

Instead of the access point identifier as described above, for example, the region information stored in the game apparatus 10 as the "apparatus body setting data" may be transmitted as data to be transmitted to the server 100 in the request process. The "apparatus body setting data" contains, for example, a name and an age of a user of the game apparatus 10, and the region information representing a region in which the user resides. The "region information" is set by, for example, an input performed by a user when the game apparatus 10 body is actuated first. Further, even after the "region information" has been set, a user may set again the "region information" by an input performed by the user. On the server 100 side, the "first specification" may be performed based on the "region information". In addition, for example, when the game apparatus 10 has a function of obtaining positional information such as a current location indicated by, for example, a GPS, the positional information having been obtained by using the function may be transmitted to the server 100. The server 100 may determine one of the regions according to a region indicated by the positional information. The description is given, in the exemplary case described above, on the assumption that the piece is distributed from the server 100 to each game apparatus 10 only once. However, in a case where, after the piece has been distributed from the server 100 to each game apparatus 10, a region represented by the positional information indicating the current location is changed, redistribution of the piece from the server 100 to each game apparatus 10 may be allowed such that the piece can be distributed multiple times.

Further, not only the "first specification" but also the "second specification" may be performed on the server 100 side. Namely, the "subject-data-to-be-collected" may be specified on the server 100 side, and the result thereof may be transmitted to the game apparatus 10. In this case, data representing, as it is, an image of a piece corresponding to the "subject-data-to-be-collected" may be transmitted as data to be transmitted from the server 100 to the game apparatus 10, without transmitting the viewed image data. Alternatively, data representing an index that indicates a location of the piece may be transmitted as the "subject-data-to-be-collected", together with the viewed image data.

The "subject-data-to-be-collected" stored by the cooperative process described above being performed is exchanged between the game apparatus 10 and another game apparatus 10 by using the "background local communication", to collect the "subject-data-to-be-collected" (P02). In the exemplary embodiment described herein, for example, in a case where the game apparatus 10*a* having stored therein a plurality of pieces (a plurality of pieces of "subject-data-to-be-collected") performs the "background local communication" with the game apparatus 10*b*, the game apparatus 10*b* displays a list of the plurality of pieces obtained from the game apparatus 10*a*, to allow a user to select one of the plurality of pieces, thereby enabling the user to enjoy collecting the pieces for a long time.

Although, in the above description, the "background local communication" is performed such that the game apparatuses 10 close to each other directly connect to each other by using the local communication, communication between the game apparatuses 10 close to each other may be performed in the following manner. An exemplary case will be described on the assumption that the game apparatuses 10 each have a GPS mounted thereto. The game apparatus transmits, to the predetermined server 100, positional information data obtained by the GPS, date and time information data representing a date and time at which the positional information data has been obtained, and the "subject-data-to-be-collected". The server 100 uses the positional information data, and the date and time information data transmitted from a plurality of game apparatuses to detect and determine the game apparatuses 10 that have approached each other within a predetermined distance in a certain time zone. Namely, in the server 100, whether or not the game apparatuses 10 have "passed" each other is determined by using the positional information from each game apparatus 10. Thus, the "subject-data-to-be-collected" may be transmitted to the game apparatus from the server 100 such that the "subject-data-to-be-collected" is exchanged between the game apparatuses 10 that are determined to have "passed" each other.

In the configuration as described above, a plurality of the game apparatuses 10 each generate or obtain a piece for a certain image automatically (without being noticed by a user)

in a process using the "background Internet communication", and further a user is allowed to collect, by using the "background local communication", other pieces which are not processed by the user. As a result, a motivation for a user to go out with the game apparatus 10 (so as to pass another person) can be generated. Further, images to be distributed are added in the server 100, and pieces corresponding to the added images are further distributed, so that images to be collected can be increased.

(Details of Processes Performed by Server 100 and Game Apparatus 10)

Next, an exemplary process performed in the exemplary embodiment will be described in detail. In the exemplary embodiment described herein, an exemplary case in which a portion of the process for determining the piece is performed on the server 100 side as described above with reference to FIG. 9 will be described in detail.

Figures 10, 11, 12:
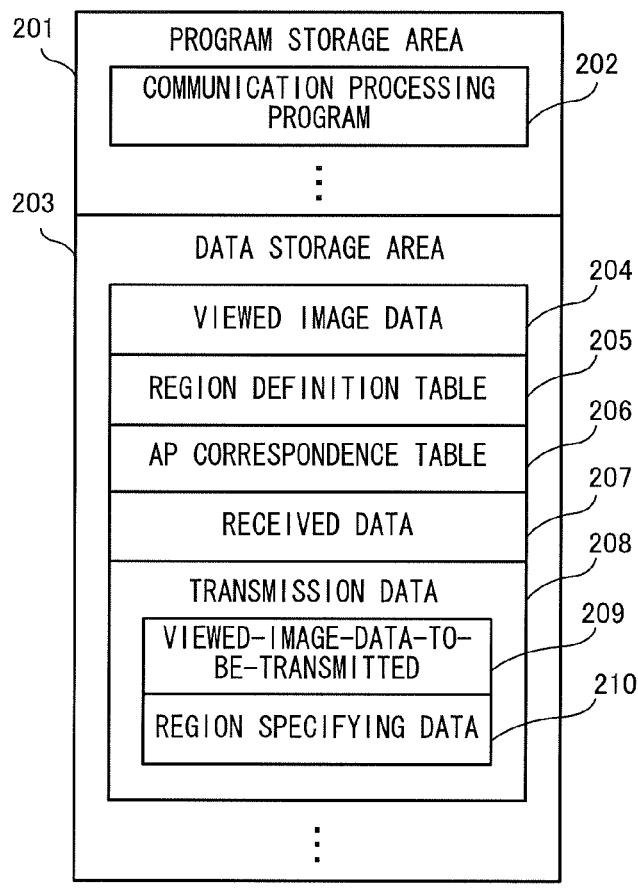
FIG. 10 shows a non-limiting exemplary memory map of a RAM 103 in the server 100.
FIG. 11 shows a non-limiting exemplary structure of a region definition table 205.
FIG. 12 shows a non-limiting exemplary structure of an AP correspondence table 206.

Firstly, various data used in the exemplary embodiment will be described. Data used in the server 100 will be firstly described. FIG. 10 shows a non-limiting exemplary memory map of the RAM 103 in the server 100. The RAM 103 of the server 100 includes a program storage area 201 and a data storage area 203. Further, when a program is executed, data stored in the storage section 104 is transferred to the RAM 103, and stored in the program storage area 201 and the data storage area 203.

In the program storage area 201, for example, a communication processing program 202 for controlling a process for communication with the game apparatus 10 and the like is stored.

In the data storage area 203, viewed image data 204, a region definition table 205, an AP correspondence table 206, received data 207, transmission data 208, and the like are stored.

The viewed image data 204 represents the viewed image as described above, and data corresponding to one or more viewed images is stored as the viewed image data 204. The region definition table 205 represents, for example, a location of each of the nine regions into which the viewed image described above is equally divided. FIG. 11 shows a non-limiting exemplary structure of the region definition table 205. In this table, locations of the regions are designated by using coordinates, and group names corresponding to the regions are defined. Further, the table is provided for each image.

Returning to FIG. 10, the AP correspondence table 206 is a table in which the access point 200 which is being used by the game apparatus 10 communicating with the server 100 is associated with a portion (for example, one of the nine regions into which the image has been equally divided) of the region of the viewed image (in other words, a table to be used with the region definition table 205 for the "first specification"). FIG. 12 shows a non-limiting exemplary structure of the table. The correspondence table shown in FIG. 12 indicates the AP identifiers and the group names. The group names correspond to the group names, respectively, defined in the region correspondence table 205, and correspond to, for example, the nine regions, respectively, into which the image has been equally divided (for example, group A to group I).

In a case where, instead of the access point identifier, the region information or the positional information are used for specifying a predetermined region on the viewed image, the AP identifier may be replaced with the region information or the positional information in the table.

Returning to FIG. 10, the received data 207 is stored as data transmitted from the game apparatus 10. The received data 207 is stored as data containing, for example, the access point identifier representing the access point 200 being used by the game apparatus 10 in the communication being currently performed.

The transmission data 208 is data to be transmitted to the game apparatus 10, and contains viewed-image-data-to-be-transmitted 209 and region specifying data 210. The viewed-image-data-to-be-transmitted 209 is data representing one viewed image which is obtained by copying the viewed image data 204. The region specifying data 210 is used for specifying, in the image, a predetermined region which is determined based on the access point identifier and the AP correspondence table 206 (the region specifying data 210 is, for example, data indicating the "group B"). Further, the region specifying data 210 may contain contents of the region definition table 205. In a case where, instead of the viewed image, for example, a music or a moving image is used, the region specifying data 210 may represent a reproduction location and/or a reproduction period (from a reproduction start location to a reproduction end location) of the music or the moving image.

Next, data used in the game apparatus 10 will be described. FIG. 13 shows a non-limiting exemplary memory map of the main memory 32 in the game apparatus 10. The data described herein is stored in, for example, the internal data storage memory 35, and is transferred to and stored in the main memory 32 when a program is executed. The main memory 32 includes a program storage area 221 and a data storage area 224. In the program storage area 221, for example, a communication processing program 222 for controlling a process of communication with the server 100 and the like, and a collection game program 223 for executing a game process using the "subject-data-to-be-collected" are stored.

In the data storage area 224, the Internet communication data 225, local communication data 229, application data 232, and the like are stored. The Internet communication data 225 is used for the "background Internet communication" as described above, and includes task definition data 226, the Internet transmission data 227, and the Internet reception data 228. The task definition data 226 defines contents of an operation of the "background Internet communication". For example, the task definition data 226 includes: information indicating an application associated with the "background Internet communication" (contents of the "background Internet communication" can be defined for each application); information about contents of data to be transmitted and received in the "background Internet communication", and information about the server 100 that is a communication partner; data representing, for example, an environment for an operation for the "background Internet communication", such as a time at which the "background Internet communication" is performed, and the time intervals at which the "background Internet communication" is performed (for example, the "background Internet communication" is to be performed once a month).

The Internet transmission data 227 is data to be transmitted to the server 100 via the Internet, and the Internet reception data 228 is stored as data transmitted from the server 100 in the "background Internet communication". In the exemplary embodiment described herein, the contents of the transmission data 208 from the server 100 are stored as the Internet reception data 228 in the game apparatus 10.

The local communication data 229 is data to be transmitted and received in the "background local communication", and includes local transmission data 230 which is data to be transmitted to another game apparatus 10, and local reception data 231 which is data received from another game apparatus 10.

The application data 232 is data used for the collection game process as described above. The application data 232 includes viewed image data 233, the subject-data-to-be-collected 234, and the like. The viewed image data 233 is obtained by the "background Internet communication", and is obtained as a copy of the viewed image data contained in the Internet reception data 228. The subject-data-to-be-collected 234 is data corresponding to a piece for a viewed image. In the exemplary embodiment described herein, the contents of the subject-data-to-be-collected 234 are represented by data of an index indicating a location of the piece in the viewed image. For example, the subject-data-to-be-collected 234 represents contents such as "NO. 3 in group B" or "NO. 6 in region C".

Figure 14:
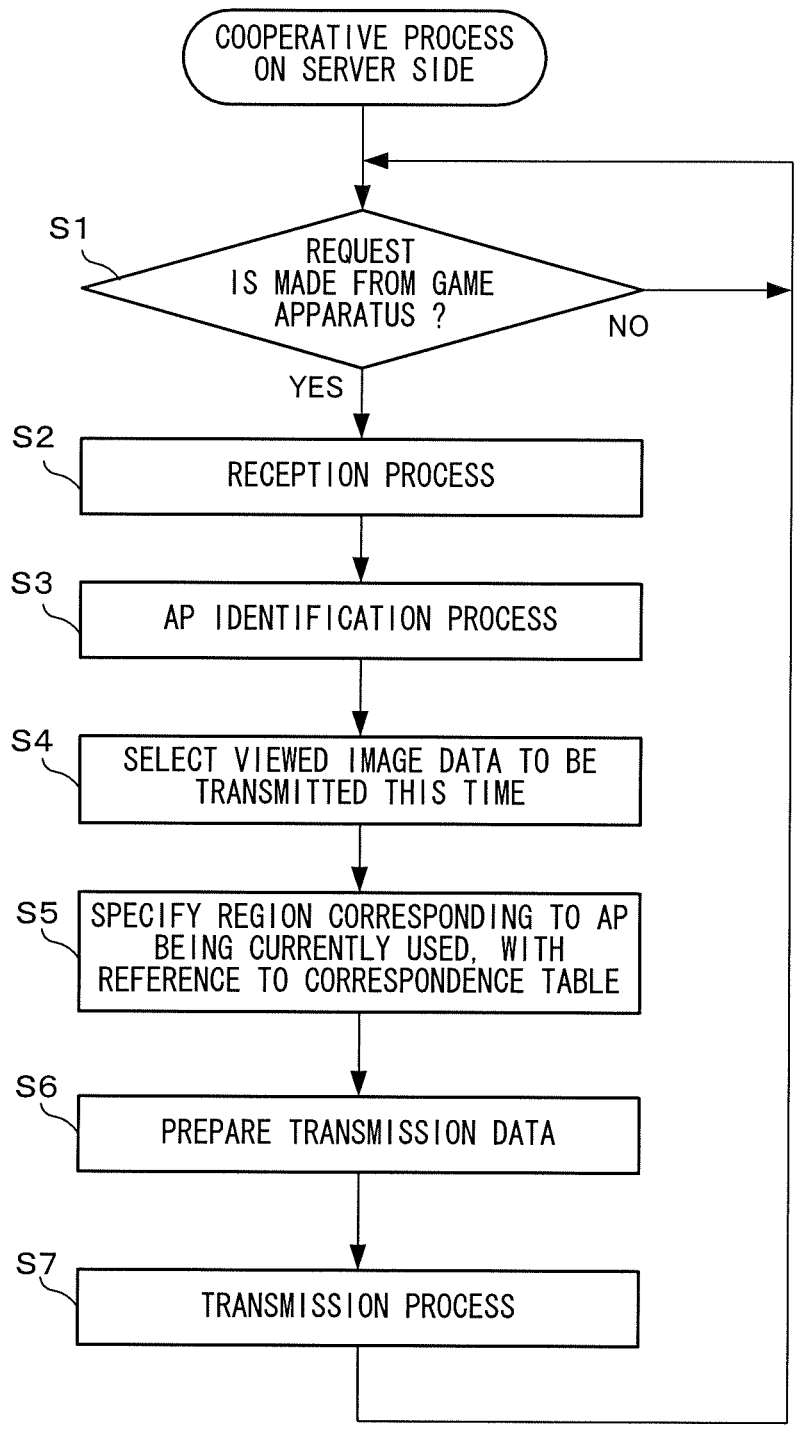
FIG. 14 shows in detail a non-limiting exemplary cooperative process performed by the server 100.

Next, the cooperative process performed by the server 100 will be described in detail with reference to FIG. 14. Firstly, in step S1, the CPU 101 determines whether a request for the cooperative process has been transmitted from the game apparatus 10. When the request has not been transmitted (NO in step S1), the process step of step S1 is performed again (namely, a waiting process is performed). On the other hand, when the request for the cooperative process has been transmitted from the game apparatus 10 (YES in step S1), the CPU 101 subsequently performs, in step S2, a process for receiving data transmitted from the game apparatus 10. The received data contains the access point identifier indicating the access point 200 being used by the game apparatus 10 in this communication.

Subsequently, in step S3, the CPU 101 obtains the access point identifier contained in the received data, to identify the access point 200 which is being used in the communication being currently performed. In the subsequent step S4, the CPU 101 determines the viewed image to be transmitted in this communication, and obtains data thereof from the viewed image data 204. The image may be determined in any manner. For example, the image may be determined according to the access point 200 having been identified, or may be determined based on the current date and time.

Subsequently, in step S5, the CPU 101 specifies, with reference to the AP correspondence table 206 and the region definition table 205, a region, on the viewed image, corresponding to the access point 200 which is being used in the communication being currently performed.

Subsequently, in step S6, the CPU 101 performs a process for preparing transmission data. Specifically, the region specifying data 210 representing the specified region is generated, and the viewed-image-data-to-be-transmitted 209 is generated based on the viewed image data selected in step S4, to generate the transmission data 208.

Subsequently, in step S7, the CPU 101 executes a process for transmitting the transmission data 208 to the game apparatus 10. When the communication has ended, the CPU 101 performs a process such as communication stop process according to need, and the process is returned to step S1. This is the end of the description of the cooperative process performed on the server 100 side.

Subsequently, a process performed by the game apparatus 10 will be described in detail. Firstly, the cooperative process performed in cooperation with the server 100 will be described with reference to FIG. 15. This process is mainly divided into a series of process steps (steps S21 to S22 described below) performed as the "background Internet communication" described above, and a series of process steps (steps S23 to S26 described below) performed as a portion of a process for the application (the collection game in the exemplary embodiment described herein) executed after the "background Internet communication".

The process as "the background Internet communication" is performed when, for example, the game apparatus 10 operates in the "sleep mode", and the game apparatus 10 connects to a predetermined access point 200 located within a range in which the game apparatus 10 is allowed to communicate with the predetermined access point 200, to enable the Internet communication (when the communication with the server 100 has become available).

Figure 15:
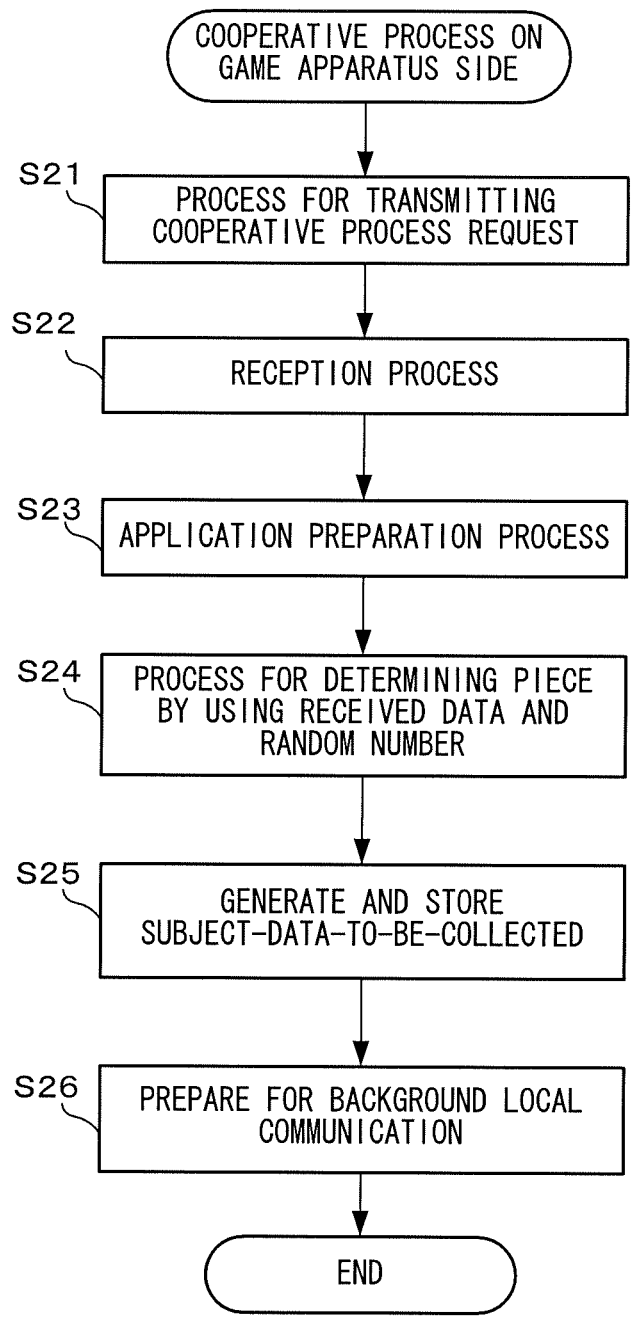
FIG. 15 shows in detail a non-limiting exemplary cooperative process performed by the game apparatus 10.

In FIG. 15, firstly, in step S21, the CPU 311 transmits, to the server 100, a request for starting the cooperative process. When this request is received, the process as described above is performed on the server 100 side, and the data as described above is transmitted from the server 100.

Subsequently, in step S22, the CPU 311 performs a process for receiving the data transmitted from the server 100. The received data is stored as the Internet reception data 228. Further, a process for ending the "background Internet communication" is performed according to need.

Thereafter, at a time at which the collection game is started up, the process steps of step S23 and the subsequent process steps are performed (the process steps of step S23 and the subsequent process steps may be performed as a portion of the process for the "background Internet communication" without waiting for the startup of the collection game). Firstly, when the collection game is started up, the CPU 311 performs an application preparation process in step S23. Specifically, the viewed image data contained in the Internet reception data 228 is copied as the viewed image data 233 of the application data 232. Further, the region specifying data 210 contained in the received data is similarly copied, as a portion of the application data 232, into the main memory 32. In addition, a process for copying, into the application data 232, the "subject-data-to-be-collected" obtained from another game apparatus 10 by the "background local communication", is also performed according to need.

Subsequently, in step S24, the CPU 311 performs a process for determining one piece in the viewed image by using the data received by the "background Internet communication", and a random number. Specifically, firstly, the CPU 311 specifies a predetermined region in the viewed image based on the region specifying data (first specification). A predetermined area in the specified region is further specified, by using the random number, as a piece to be (initially) possessed by the game apparatus 10 (second specification).

Subsequently, in step S25, data representing the specified piece is generated as the subject-data-to-be-collected 234, and the subject-data-to-be-collected 234 is stored in the main memory 32. The subject-data-to-be-collected 234 may be data of a real piece image representing the specified piece, or may be data representing an index indicating a location of the specified piece in the viewed image.

In the subsequent step S26, the CPU 311 copies the subject-data-to-be-collected 234 into the local transmission data 230. Thus, exchange of the subject-data-to-be-collected with another game apparatus 10 with the use of the "background local communication" becomes ready.

Thereafter, various processes for the collection game are performed according to need, which is not illustrated. For example, a process for allowing a user to confirm the pieces having been collected, or a process for enabling, if all the pieces are collected, the viewed image to be displayed as an image of a completed picture, are performed. Further, when a plurality of pieces are obtained from another game apparatus at one time, a process for allowing a user to select one of the plurality of pieces is also performed. This is the end of the description for the cooperative process performed on the game apparatus side.

Next, a background local communication process for exchange of the subject-data-to-be-collected 234 with another game apparatus 10 will be described in detail with reference to FIG. 16. This process is repeatedly performed (so as to alternate with the "background Internet communication") when, for example, the game apparatus 10 is in the "sleep mode".

Figure 16:
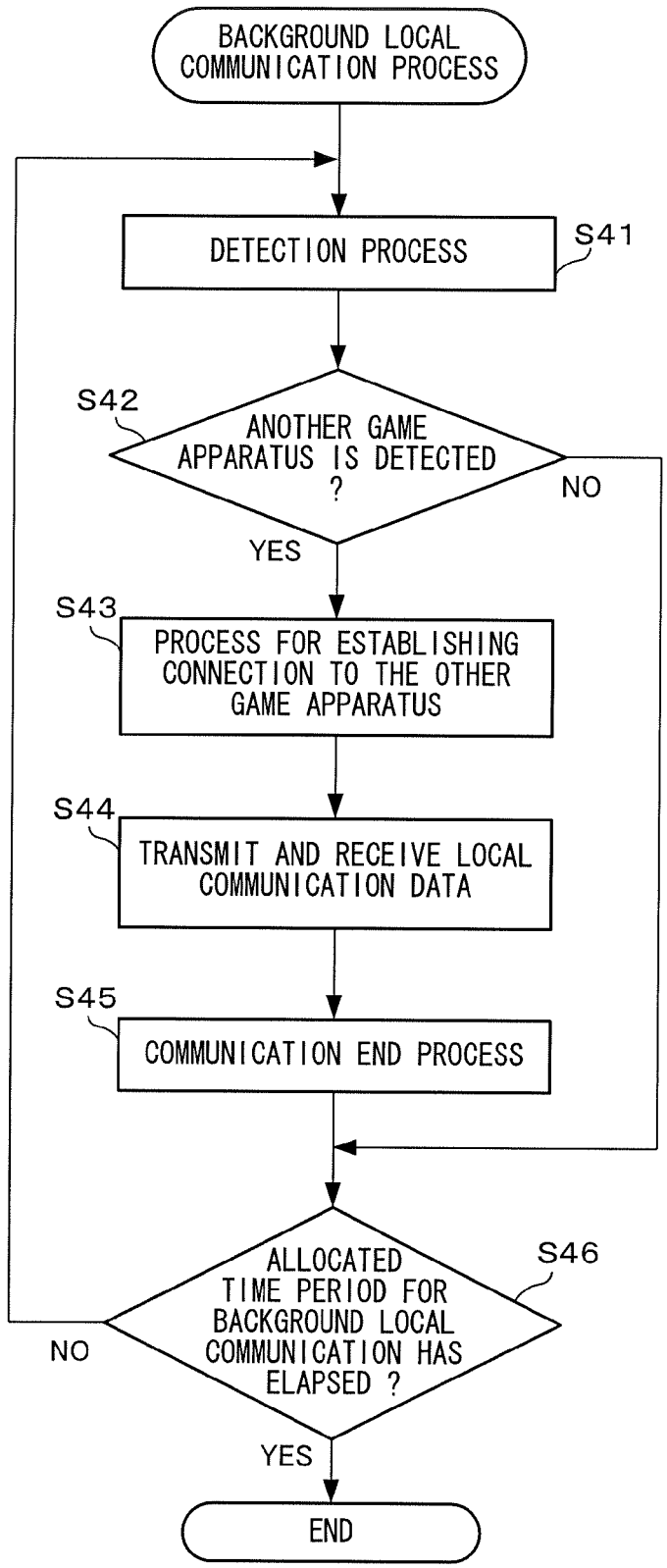
FIG. 16 shows in detail a non-limiting exemplary background local communication process.

In FIG. 16, firstly, in step S41, a process for detecting for presence of another game apparatus 10 is performed. For example, a beacon from another game apparatus 10 for requesting the "background local communication" is detected for, or an affirmative response, from another game apparatus 10, to a beacon outputted by the own game apparatus 10 is detected for, so as to detect for the presence of another game apparatus 10.

Subsequently, in step S42, as a result of the detection process, whether presence of another game apparatus 10 has been detected is determined. The result indicates that presence of another game apparatus 10 is not detected (NO in step S42), the process is advanced to step S46 described below.

On the other hand, when presence of another game apparatus 10 is detected (YES in step S42), a process for establishing connection to the other game apparatus 10 is performed in step S43. When the connection is established, transmission and reception of the local communication data 229 is performed in step S44. Namely, the local transmission data 230 (containing the subject-data-to-be-collected) is transmitted to the other game apparatus 10, and data (containing the subject-data-to-be-collected which is possessed by the other game apparatus 10) transmitted from the other game apparatus 10 is stored as the local reception data 231.

Subsequently, in step S45, a process for ending the "background local communication" is performed according to need. Next, in step S46, whether a time period (for example, 30 seconds) allocated for the "background local communication" has elapsed, is determined. This is because the "background Internet communication" and the "background local communication" alternate with each other in the "sleep mode" as described above, and therefore a time period for the "background local communication" is limited. When the result of the determination indicates that the allocated time period has not elapsed yet (NO in step S46), the process is returned to step S41, and the process steps are repeated (as a result, the background local communication with still another game apparatus 10 can be performed). On the other hand, when the allocated time period has elapsed (YES in step S46), the background local communication process is ended (thereafter, the process for the "background Internet communication" is started). This is the end of the detailed description for the process according to the exemplary embodiment.

As described above, in the exemplary embodiment described herein, an image is divided into multiple pieces, and one of the multiple pieces is distributed to the game apparatus. The short distance wireless communication between the game apparatuses 10 is used for collection of the pieces, so that the viewed image can be eventually completed. Thus, images to be distributed can be added on the server 100 side, and can be distributed to the game apparatus 10. Thus, the limitation of the number of images to be collected can be eliminated.

Further, distribution of pieces can be controlled to some degree according to the access points 200. Therefore, the pieces to be distributed can be dispersed in consideration of a geographical situation, for example, based on regions or shops (in which the access points are mounted), to some degree (for example, such that some pieces are likely to be collected in region A although they are less likely to be collected in region D).

In a case where the features described above are applied to a subject other than the viewed image, for example, to a so-called trading card in a trading card game, a card to be firstly distributed to the game apparatus 10 may be determined by performing the "first specification" and the "second specification" as described above. Specifically, when, for example, 90 cards (data representing 90 cards) are prepared in total, the cards may be sorted into groups each containing 10 cards, and one of the groups may be specified on the server 100 side in the "first specification", and one card or more cards among the 10 cards contained in the selected group may be determined by using a random number on the game apparatus 10 side in the "second specification".

Further, in the exemplary embodiment described above, a hand-held game apparatus including two display devices has been described as an example. However, a hand-held terminal that includes a single display device and is capable of communicating with the server and another information processing apparatus may be used.

Further, in the exemplary embodiment described above, the subject-data-to-be-collected which is distributed from the server 100 according to a request from the game apparatus 10 is received by the game apparatus 10 via the access point 200. However, in another exemplary embodiment, the subject-data-to-be-collected which is distributed from the server 100 may be not only transmitted to the game apparatus 10, but also may be stored in the access point 200 as it is. In this case, when it is thereafter determined that another game apparatus 10 is close to the access point 200, the game apparatus 10 is allowed to receive the subject-data-to-be-collected which is stored in the access point 200. Thus, an amount of communication between the access point 200 and the server 100 can be reduced.

Further, various programs for executing the processes according to the exemplary embodiment described above may be stored in any computer-readable storage medium (such as a flexible disk, a hard disk, an optical disc, a magneto-optical disk, a CD-ROM, a CD-R, a magnetic tape, a semiconductor memory card, a ROM, and a RAM).

What is claimed is:

1. An information processing system including a server, and a plurality of hand-held information terminals connectable to the server via a network, the information processing system comprising:
 a first processor configured to
  generate or select subject-data-to-be-collected representing an element to be collected, when the server and any one of the plurality of hand-held information terminals cooperate with each other to perform predetermined information processing by using data transmitted and received between the server and the one of the plurality of hand-held information terminals, and
  transmit the generated or selected subject-data-to-be-collected from the server to the one of the plurality of handheld information terminals,
 wherein each one of the plurality of hand-held information terminals includes
  a first transmitter configured to directly transmit to another one of the plurality of hand-held information terminals, the subject-data-to-be-collected transmitted from the server to the one of the plurality of handheld information terminals, and a first receiver configured to directly receive from other one of the plurality of hand-held information terminals other subject-data-to-be-collected, transmitted from the server to the other one of the plurality of hand-held information terminals.

2. The information processing system according to claim 1, wherein the first processor operates such that any one of the plurality of hand-held information terminals transmits, to the server, associated data which is associated with the one of the plurality of hand-held information terminals or a user of the one of the plurality of hand-held information terminals, and the server generates or selects the subject-data-to-be-collected using the associated data transmitted from the one of the plurality of hand-held information terminals.

3. The information processing system according to claim 1, wherein
each of the plurality of hand-held information terminals further includes a positional information obtaining section configured to obtain positional information about a user or about a corresponding one of the plurality of hand-held information terminals, and
the first processor generates or selects the subject-data-to-be-collected by using the positional information.

4. The information processing system according to claim 1, wherein
each of the plurality of hand-held information terminals further includes a region information obtaining section configured to obtain region information about a user or about a corresponding one of the plurality of hand-held information terminals, and
the first processor generates or selects, by using the region information, the subject-data-to-be-collected having been subjected to sorting according to a region.

5. The information processing system according to claim 1, wherein
the server further includes an identification information obtaining section configured to obtain identification information for identifying a relay device which relays communication between each of the plurality of hand-held information terminals and the server, and
the first processor generates or selects, by using the identification information, the subject-data-to-be-collected having been subjected to sorting according to the identification information.

6. The information processing system according to claim 1, wherein the subject-data-to-be-collected is data representing a portion of one complete content.

7. The information processing system according to claim 6, wherein
the subject-data-to-be-collected is specifying data used for specifying a predetermined portion, a predetermined region, or a predetermined period of the entirety of the one complete content, and
each of the plurality of hand-held information terminals further includes a storage section configured to store all data representing the one complete content, and the specifying data.

8. The information processing system according to claim 1, wherein the subject-data-to-be-collected is data representing an individual element of a predetermined collection of elements.

9. The information processing system according to claim 1, wherein the first transmitter and receiver connects to another one of the plurality of hand-held information terminals, which is a short distance away, and transmits to and receives from the one of the plurality of hand-held information terminals connected thereto, the subject-data-to-be-collected.

10. The information processing system according to claim 9, wherein the first transmitter and receiver uses a short distance wireless communication to wirelessly connect to another one of the plurality of hand-held information terminals, which is within a communication-allowed range, and transmits to and receives from the other one of the plurality of hand-held information terminals which is wirelessly connected thereto, the subject-data-to-be-collected.

11. An information processing system including a server, and a plurality of hand-held information terminals connectable to the server via a network, the information processing system comprising:
a first processor configured to
generate or select subject-data-to-be-collected representing an element to be collected, when the server and any one of the plurality of hand-held information terminals cooperate with each other to perform predetermined information processing by using data transmitted and received between the server and the one of the plurality of hand-held information terminals, and
transmit the generated or selected subject-data-to-be-collected from the server to the one of the plurality of handheld information terminals,
wherein each one of the plurality of hand-held information terminals includes
a first transmitter configured to directly transmit to another one of the plurality of hand-held information terminals, the subject-data-to-be-collected transmitted from the server to the one of the plurality of handheld information terminals, and
a first receiver configured to directly receive from other one of the plurality of hand-held information terminals other subject-data-to-be-collected, transmitted from the server to the other one of the plurality of hand-held information terminals,
wherein each of the plurality of hand-held information terminals further includes an output processor configured to perform a predetermined output process by combining a plurality of pieces of the subject-data-to-be-collected.

12. A computer-readable storage medium having stored therein an information processing program that causes a computer of an information processing system including a server, and a plurality of hand-held information terminals connectable to the server via a network, to function as:
a first processor configured to
generate or select subject-data-to-be-collected representing an element to be collected, when the server and any one of the plurality of hand-held information terminals cooperate with each other to perform predetermined information processing by using data transmitted and received between the server and the one of the plurality of hand-held information terminals, and
transmit the generated or selected subject-data-to-be-collected from the server to the one of the plurality of handheld information terminals; and
a section configured to cause each of the plurality of hand-held information terminals to act as
a transmitter configured to directly transmit to another one of the plurality of hand-held information terminals, the subject-data-to-be-collected transmitted from the server to the one of the plurality of handheld information terminals, and
a receiver configured to directly receive from other one of the plurality of hand-held information terminals other subject-data-to-be-collected, transmitted from the server to the other one of the plurality of hand-held information terminals.

13. An information processing method that controls an information processing system including a server, and a plurality of hand-held information terminals connectable to the server via a network, the information processing method comprising the steps of:
   generating or selecting subject-data-to-be-collected representing an element to be collected, when the server and any one of the plurality of hand-held information terminals cooperate with each other to perform predetermined information processing by using data transmitted and received between the server and the one of the plurality of hand-held information terminals;
   transmitting the generated or selected subject-data-to-be-collected from the server to the one of the plurality of handheld information terminals; and
   causing each of the plurality of hand-held information terminals to
      directly transmit to another one of the plurality of hand-held information terminals, the subject-data-to-be-collected transmitted from the server to the one of the plurality of handheld information terminals, and
      directly receive from other one of the plurality of hand-held information terminals other subject-data-to-be-collected, transmitted from the server to the other one of the plurality of hand-held information terminals.

* * * * *